(12) United States Patent
Fukamizu et al.

(10) Patent No.: US 7,129,671 B2
(45) Date of Patent: *Oct. 31, 2006

(54) STEPPING MOTOR DRIVE DEVICE AND METHOD

(75) Inventors: Shingo Fukamizu, Takatsuki (JP); Katsuhiro Onishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/971,689

(22) Filed: Oct. 25, 2004

(65) Prior Publication Data

US 2005/0134211 A1 Jun. 23, 2005

(30) Foreign Application Priority Data

Dec. 19, 2003 (JP) ............................. 2003-423801

(51) Int. Cl.
G05B 19/40 (2006.01)
H02P 8/12 (2006.01)

(52) U.S. Cl. ...................... 318/685; 318/696; 318/599; 318/811

(58) Field of Classification Search ............... None
See application file for complete search history.

(56) References Cited

U.S. PATENT DOCUMENTS

| | | | | |
|---|---|---|---|---|
| 6,114,826 A * | 9/2000 | Nishiura et al. | ............ | 318/685 |
| 6,529,390 B1 * | 3/2003 | Takahashi | ................ | 363/21.14 |
| 6,778,417 B1 * | 8/2004 | Itakura et al. | ................ | 363/97 |
| 6,838,853 B1 * | 1/2005 | Matsunaga et al. | ......... | 318/685 |
| 6,873,126 B1 * | 3/2005 | Inao et al. | .................. | 318/254 |
| 6,906,489 B1 * | 6/2005 | Fukamizu et al. | .......... | 318/685 |
| 2004/0232874 A1 * | 11/2004 | Fukamizu et al. | .......... | 318/696 |
| 2005/0047185 A1 * | 3/2005 | Yokouchi | ..................... | 363/132 |
| 2005/0146303 A1 * | 7/2005 | Fukamizu et al. | .......... | 318/696 |

FOREIGN PATENT DOCUMENTS

| | | |
|---|---|---|
| JP | 06-343295 | 12/1994 |
| JP | 09-172799 | 6/1997 |
| JP | 10-080194 | 3/1998 |
| JP | 11-289797 | 10/1999 |
| JP | 2000-069794 | 3/2000 |
| WO | WO 03/030349 | 4/2003 |

OTHER PUBLICATIONS

Xuqiang et al., "How to Select Electrical Control IC Lecture 20: Microstepping Motor Driver Chip A3977 with Built-In Transistor", Micromotors, vol. 35, 2002, Issue 4.
Tao,et al., "Full-Bridge PWM Microstepping Motor Drive A3955S", Journal of Anhui University Natural Science Edition, Jun. 2003, vol. 27, No. 2.
Hong et al., "Application of CPLD in Two-phase Hybrid Stepping Motor Systems", Electric Drive, 2001, Issue 4.

* cited by examiner

*Primary Examiner*—Marlon T. Fletcher
*Assistant Examiner*—Eduardo Colon Santana
(74) *Attorney, Agent, or Firm*—McDermott Will & Emery LLP

(57) ABSTRACT

A reference signal generation unit 110a generates a reference signal VCA representing a limit indicator. Under the control of a PWM control unit 120a, a bridge rectification circuit 130a controls the current supplied to a coil 19a to the limit indicator, using a current chopper method. Therewith, the circuit 130a implements synchronous rectification where transistors 10 and 12 are brought into conduction when the current supply is stopped, forming a closed circuit with the coil 19a, and a regenerative current circulates in the closed circuit. During a time period when the reference signal is decreasing relatively rapidly, a SR prohibition unit 115a prohibits the transistor 10 or 12 from being brought into conduction when the current supply is stopped, and thereby the decay of regenerative current is accelerated.

13 Claims, 28 Drawing Sheets

PATH A

PATH B

PATH C

INPUT OFFSET VOLTAGE = I×R

INPUT OFFSET VOLTAGE = $I \times \frac{R_1 + R_2}{R_1 \times R_2}$

M1~M8 : MOS TRANSISTORS

THE OPERATIONAL AMPLIFIER IS PRODUCED SO THAT EACH MOS TRANSISTOR SATISFIES THE FOLLOWING RELATIONAL EXPRESSION:

$$\frac{(W/L)_3}{(W/L)_6} = \frac{(W/L)_4}{(W/L)_6} = K\frac{(W/L)_5}{(W/L)_7}$$

WHERE $(W/L)_i$ : $M_i$ (GATE CHANNEL WIDTH / GATE CHANNEL LENGTH) OF ith TRANSISTOR $K = \frac{1}{2}$, THEN OFFSET VOLTAGE = 0

$1 \leq K \leq 2$, THEN OFFSET VOLTAGE > 0

STEPPING MOTOR DRIVE DEVICE AND METHOD

BACKGROUND OF THE INVENTION

1. Field of the Invention

The present invention relates to a stepping motor drive device, in particular to a technology for driving a stepping motor with low noise and low vibration.

2. Description of the Related Art

Late years, stepping motors are used in image capturing electronics devices, such as a DSC (Digital Still Camera) and a DVC (Digital Video Camera), as optical system actuators for adjusting aperture, focus, zoom and so on.

Stepping motors, especially those used for image capturing electronics devices, are required to operate with low noise and low vibration. This is because sounds generated by a stepping motor are caught by a built-in microphone of the electronics device and recorded as noise, while vibrations generated by a stepping motor cause image blurring and result in degradation of the recorded image.

In response to such a demand, a drive technology for stepping motor operations with low noise and low vibration has been disclosed, for instance, by Japanese Laid-Open Patent Application No. H06-343295.

FIG. 28 is a drive device disclosed by this publication. The following description will focus only on components necessary for explaining the principle of the drive device.

In FIG. 28, reference numeral 20 denotes a stepping motor that is a controlled object, reference numeral 45 is a rotor, and reference numerals 19a and 19b are a first coil and a second coil, respectively.

An up-down counter 43a counts up or down a clock signal CLKP according to an up-down signal DA, and provides a 4-bit signal DA1–DA4, which indicates the counted value, to a D/A converter 44a.

The D/A converter 44a outputs a voltage signal VCA corresponding to the 4-bit signal DA1–DA4. The voltage signal VCA is a staircase waveform that increases and decreases stepwise. The rate of change in the voltage signal VCA can be altered depending on the pulse frequency of clock signal CLKP and the step height of voltage signal VCA, and accelerates as the pulse frequency of clock signal CLKP becomes higher., or the step height of voltage signal VCA becomes larger. In addition, the voltage signal VCA can be maintained constant by stopping the clock signal CLKP.

In a voltage drive circuit 39a, the voltage signal VCA is amplified by a non-inverting power amplifier 41a, and also by an inverting power amplifier 42a. Thus, the first coil 19a which is connected between output terminals of the power amplifiers 41a and 42a is driven by the application of a voltage.

The components similar to ones for the first coil 19a above are provided for the second coil 19b, and the same operations are performed in order to drive the second coil 19b by applying the staircase voltage.

According to this configuration, the applied voltage increases stepwise at the start of the period for current supply to the coil, while the applied voltage decreases stepwise when the supply is stopped. Herewith, vibration and noise induced by abrupt torque fluctuations at the start and stop of current supply are reduced.

However, as to the drive device of the related art above, the attenuation of the coil current at the time when the staircase signal is decreasing is slow, and therefore the coil current poorly follows the staircase signal. The same is true if for instance a staircase signal approximating a sine wave (hereinafter, referred to simply as 'an approximate sinusoidal staircase signal') is used, with a view to reducing vibration and noise of the stepping motor. The coil current does not exactly follow the approximate sinusoidal staircase signal. As a result, this presents the first problem that an intended reduction in vibration and noise cannot be obtained.

This is a serious problem particularly when the stepping motor is applied to image capturing electronics devices, and thus there is still a demand for further reduction in noise and vibration of the stepping motor operations.

In addition, there is a second problem that the drive device of the above related art requires a considerable amount of power since the coil current is continuously supplied.

SUMMARY OF THE INVENTION

In view of the above problems, a first object of the present invention is to provide a drive device that reduces the noise and vibration caused by the operations of a stepping motor which is driven by the device.

Additionally, a second object of the present invention is to provide a drive device which reduces power required to drive the stepping motor.

Solution for the Problems

In order to solve the above-described problems, the stepping motor drive device of the present invention comprises: a supply current measurement unit operable to measure a supply current to a coil of a stepping motor; a chopper unit operable to pass the supply current in a conducting state and stop the supply current in a non-conducting state; a PWM control unit operable to (i) bring the chopper unit into the conducting state in a predetermined cycle, and (ii) when in each cycle the measured supply current exceeds a limit indicator, to which the supply current is to be controlled and which is represented by a predetermined reference signal whose signal level changes over time, bring the chopper unit into the non-conducting state; a synchronous rectification unit operable to form, in a conducting state, a closed circuit together with the coil; a synchronous rectification control unit operable to bring, during a time period when the chopper unit is in the non-conducting state, the synchronous rectification unit into the conducting state so as to make a regenerative current from the coil circulate around the closed circuit; and a synchronous rectification prohibition unit operable to prohibit, for at least a portion of a time period during which the limit indicator is decreasing, the synchronous rectification control unit from bringing the synchronous rectification unit into the conducting state.

Here, the stepping motor drive device may further comprise a flywheel diode which is connected in parallel with the synchronous rectification unit, wherein the synchronous rectification control unit makes the regenerative current circulate in the closed circuit through the flywheel diode during a time period when the synchronous rectification unit is in the non-conducting state.

Here, the supply current measurement unit may be a resistor connected in series with the coil and measures the supply current using a voltage appearing across the resistor.

Here, the stepping motor drive device may further comprise: a bridge rectification circuit which includes the chopper unit, the synchronous rectification unit, and a plurality of switching units, and is operable to rectify the supply current; and a reference direction control unit operable to reverse a reference direction in which the supply current is to be managed, by bringing each of the switching units in the bridge rectification circuit into a predetermined state that is one of the conducting state and the non-conducting state.

Advantageous Effects of the Invention

In the view toward achieving a reduction in vibration and noise, suppose that, for example, an approximate sinusoidal staircase signal is used as the reference signal for controlling the coil current. In this case, by prohibiting the synchronous rectification, a stepping motor drive device with the above configurations makes the coil current decay rapidly during a period when the reference signal is decreasing at a relatively rapid rate. Herewith, the coil current follows the limit indicator precisely. In the time other than the above period, on the other hand, the power supply efficiency is enhanced by carrying out the synchronous rectification and thereby mitigating decay of the coil current.

Thus, providing implementation and prohibition periods of the synchronous rectification according to the decreasing rate of the reference signal allows to achieve a reduction in vibration and noise as well as a good efficiency in the power supply.

In addition, the stepping motor drive device of the present invention exercises a PWM control on the supply current to the coil, using a current chopper method. This achieves lower power operation compared to the case where the current is supplied to the coil by voltage control.

Here, the synchronous rectification prohibition unit may (i) acquire a specification signal which specifies one of a plurality of different portions of a time period during which the limit indicator is decreasing, and (ii) during the specified portion, prohibit the synchronous rectification control unit from bringing the synchronous rectification unit into the conducting state.

With this configuration, the prohibition time portion of the synchronous rectification set during the time when the limit indicator is decreasing can be varied according to the specification signal.

When the reference signal is for instance an approximate sinusoidal staircase signal, it is generally preferred that, as the frequency of the staircase signal becomes higher, the synchronous rectification is prohibited for a longer portion of time when the limit indicator is decreasing. Here, appropriate control in response to changes in the frequency of the frequency of the staircase signal can be achieved by providing the specification signal based on the frequency. Furthermore, when the amplitude of the reference signal is to be adjusted in order to control the torque, it is also possible to achieve appropriate control in response to changes in the amplitude.

Here, the supply current measurement unit may output a measurement result which is obtained by adding a positive offset to the measured supply current, and the PWM control unit (i) brings the chopper unit into the conducting state in the predetermined cycle, and (ii) when in each cycle the measurement result exceeds the limit indicator, brings the chopper unit into the non-conducting state.

There has been a problem that an output from the supply current measurement unit is not obtained for the coil current less than a predetermined current level, and therefore the coil current cannot be controlled to be less than the predetermined current level. The above configuration eliminates this problem even under the worst conditions in individual differences among the supply current measurement units and temperature variation. Namely, the coil current can be properly controlled to the limit indicator represented by the reference signal, until it reaches zero.

As a result, a drop in the coil current occurring when the reference direction reverses, which results in the ripple factor, is eradicated and consequently vibration and noise induced when the motor is driven can be adequately reduced.

Here, the reference direction may be indicated by a polarity signal, wherein the stepping motor drive device further comprises a timing adjustment unit operable to delay the polarity signal for a time period required for the limit indicator to decrease by a predetermined amount, and the reference direction control unit reverses the reference direction according to the delayed polarity signal.

This configuration has a positive effect in the case where the polarity signal reverses its phase when the regenerative current from the coil has not yet come sufficiently close to zero. In the above configuration, the reference direction is not reversed until a time period required for the regenerative current to come sufficiently close to zero after the phase reversal of the polarity signal has elapsed.

If the reference direction is reversed as soon as the phase of the polarity signal reverses, the supply current from the power supply circuit starts to flow in the reverse direction of the regenerative current circulating at the time. As a result, this causes abrupt torque fluctuations, compared to the case of letting the stored energy in the coil released within the bridge rectification circuit. These abrupt torque fluctuations are a cause of vibration and noise induced when the motor is driven. Therefore, these vibration and noise can be adequately reduced by reversing the reference direction after the regenerative current has come sufficiently close to zero and thereby reducing the torque fluctuations.

Here, the PWM control unit may maintain the chopper unit in the non-conducting state while the reference signal represents the limit indicator as zero.

Here, the reference signal may be represented in a staircase waveform, wherein the stepping motor drive device further comprises a receiving unit operable to receive a data signal which indicates a level of each step of the reference signal, and a reference signal generation unit operable to generate the reference signal by digital-to-analog converting the received data signal within a time period corresponding to each step.

According to this configuration, a staircase signal approximating any waveform is generated based on the data. In particular, using an approximate sinusoidal staircase signal makes an eminent effect on a reduction in vibration and noise.

Here, the stepping motor may have a plurality of coils corresponding one-to-one with a plurality of phases, and for each of the plurality of coils the limit indicator is represented by an individual reference signal, wherein the supply current measurement unit measures the supply current for each of the plurality of coils, the chopper unit is provided for each of the plurality of coils, and passes the supply current to the coil in the conducting state and stops the supply current to the coil, the PWM control unit, for each of the plurality of coils, (i) brings the corresponding chopper unit into the conducting state in the predetermined cycle, and (ii) when in each cycle the measured supply current exceeds the limit indicator, brings the corresponding chopper unit into the non-conducting state, the synchronous rectification unit is provided for each of the plurality of coils and forms an individual closed circuit together with the coil in the conducting state, the synchronous rectification control unit controls, for each of the plurality of coils, the corresponding synchronous rectification unit so as to make the regenerative current from the coil circulate around the corresponding closed circuit, and the synchronous rectification prohibition unit prohibits, for each of the plurality of coils, the synchronous rectification control unit from bringing the corresponding synchronous rectification unit into the conducting state.

With this configuration, the stepping motor drive device is able to achieve the above effects by separately controlling the respective supply currents provided to a plurality of coils, which corresponds one-to-one with a plurality of phases.

In order to solve the above-described problems, a stepping motor drive method for a drive device having a synchronous rectification unit, the synchronous rectification unit which forms, in a conducting state, a closed circuit together with a coil included in a stepping motor comprises the steps of: (a) measuring a supply current to the coil; (b) making the supply current flow to the coil in a predetermined cycle and stopping the supply current when in each cycle the measured supply current exceeds a limit indicator, to which the supply current is to be controlled and which is represented by a predetermined reference signal whose signal level changes over time; (c) bringing the synchronous rectification unit into a conducting state while the supply current is stopped so as to make a regenerative current from the coil circulate around the closed circuit; and (d) prohibiting the synchronous rectification unit, for at least a portion of a time period during which the limit indicator is decreasing, from being brought into the conducting state in the step (c).

Here, the step (a) may comprises an offset adding sub-step of adding a positive offset to the measured supply current, wherein the step (a) takes the offset-added supply current as a measurement result, the step (b) makes the supply current flow to the coil in the predetermined cycle and stops the supply current when in each cycle the measurement result exceeds the limit indicator.

The stepping motor drive method may further comprise the steps of: (e) acquiring a polarity signal which indicates a reference direction in which the supply current is to be managed, (f) delaying the polarity signal for a time period required for the limit indicator to decrease by a predetermined amount, and (g) reversing the reference direction according to the delayed polarity signal.

Driving a stepping motor according to these methods can achieve the same effects as described for the drive device.

BRIEF DESCRIPTION OF THE DRAWINGS

These and the other objects, advantages and features of the invention will become apparent from the following description thereof taken in conjunction with the accompanying drawings which illustrate specific embodiments of the invention.

In the drawings.

DESCRIPTION OF THE PREFERRED EMBODIMENT

The stepping motor drive device according to the embodiments of the present invention is described with reference to the drawings.

1. First Embodiment

A stepping motor drive device of the first embodiment of the present invention generates a reference signal that represents a limit indicator, and exercises PWM (Pulse Width Modulation) control on a current supplied to the motor coil, according to the limit indicator. More specifically, the PWM control is executed using a current chopper method.

In addition, the stepping motor drive device implements synchronous rectification. In this rectification process, a switch for the synchronous rectification is brought into conduction and forms a closed circuit together with the motor coil during the period when the current supply to the motor coil is stopped. In this closed circuit, a regenerative current from the motor coil is circulated through the switch. However, the switch drops out of conduction at least for a period of time when the limit indicator represented by the reference signal is decreasing, and the regenerative current from the motor coil is circulated through a flywheel diode connected in parallel with the switch. In short, the synchronous rectification is prohibited during the time period.

The following explains the details of the stepping motor drive device with reference to drawings.

1.1 Overall Configuration

Figure 1:
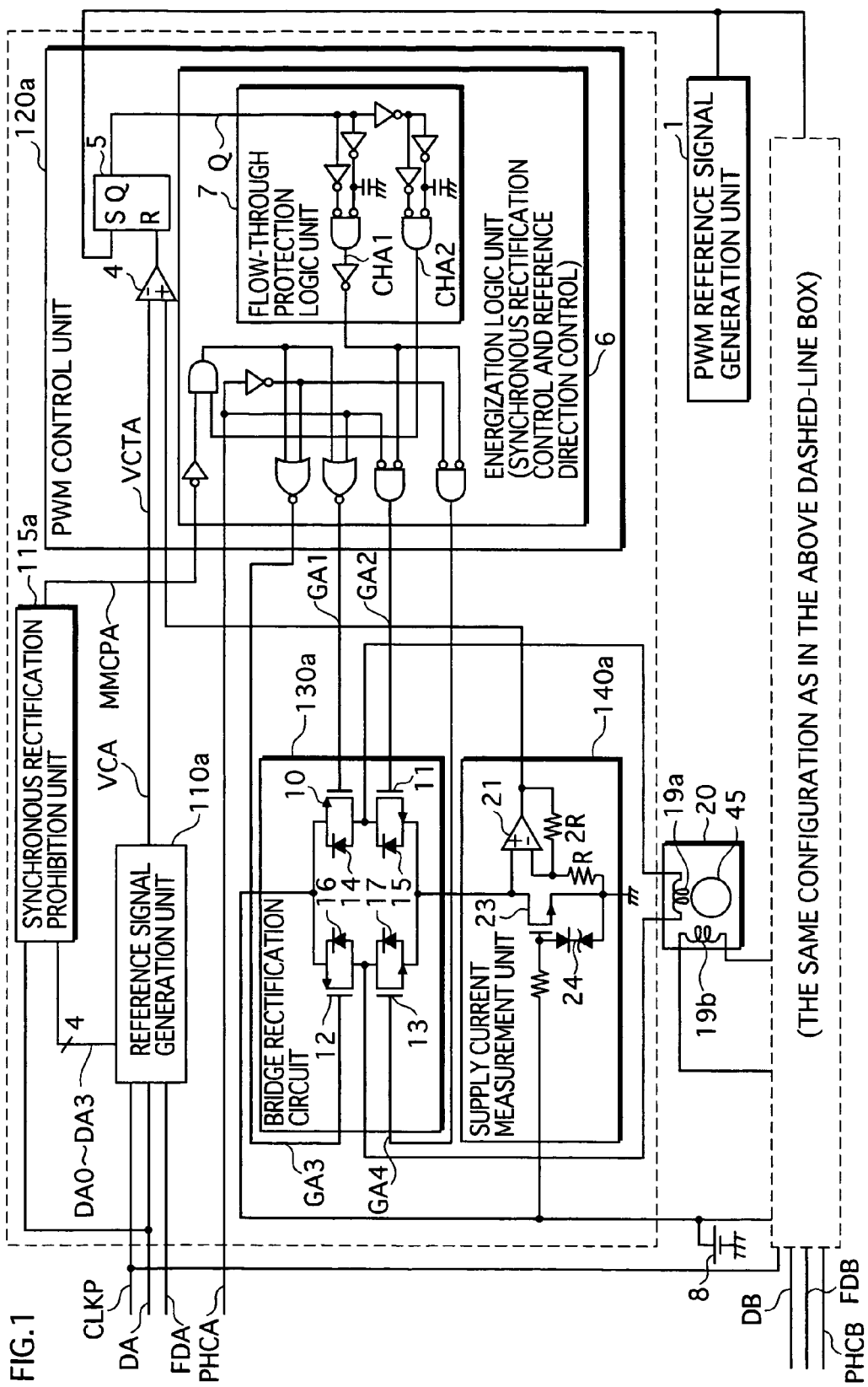
FIG. 1 is a functional block diagram showing an overall configuration of a stepping motor drive device according to the first embodiment.

FIG. 1 is a functional block diagram showing an overall configuration of the stepping motor drive device. Note that a stepping motor which is driven by the device is also shown in the figure.

In FIG. 1, reference numeral 20 denotes a stepping motor, reference numeral 45 is a rotor, and reference numerals 19a and 19b are a first coil and a second coil, each corresponding to a different phase.

The stepping motor drive device is composed of: a PWM reference signal generation unit 1, a reference signal generation unit 110a, a synchronous rectification prohibition unit (hereafter, 'SR prohibition unit') 115a, a PWM control unit 120a, a bridge rectification circuit 130a, a supply current measurement unit 140a, and a power supply 8.

Since the same components are provided for respective coils, the following description presents components of the first coil as a representative example.

The PWM control unit 120a comprises a comparator 4, a flip-flop 5, and an energization logic unit 6. Included in this energization logic unit 6 is a flow-through protection logic unit 7. The bridge rectification circuit 130a comprises MOSFETs (Metal Oxide Semiconductor Field Effect Transistors, hereinafter simply 'transistors') 10 to 13 and flywheel diodes 14 to 17.

The energization logic unit 6 functions as the synchronous rectification control unit as well as the reference direction control unit cited in the claims of this application. By sending predetermined gate signals to the bridge rectification circuit 130a, the energization logic unit 6 controls a direction of a reference current (hereinafter, 'a reference direction') for managing the synchronous rectification and the supply current.

When a current is being supplied to the coil 19a, one of the transistors 11 and 13 whichever corresponds to the reference direction chops the supply current according to the gate signals sent from the energization logic unit 6. Here, the transistors 11 and 13 are the chopper units cited in the claims. In a regenerative period, both transistors 10 and 12 are brought into conduction, and the regenerative current from the coil 19a is controlled under the synchronous rectification. Alternatively, one of the transistors 10 and 12 goes into conduction while the other is brought into non-conduction, and the regenerative current is circulated through the flywheel diode which is connected in parallel with the transistor in the non-conducting state.

The supply current measurement unit 140a includes an ON resistance adjustment circuit 24, a transistor 23, and an amplifier 21.

1.2 Reference Signal Generation Unit 110a

Figure 2:
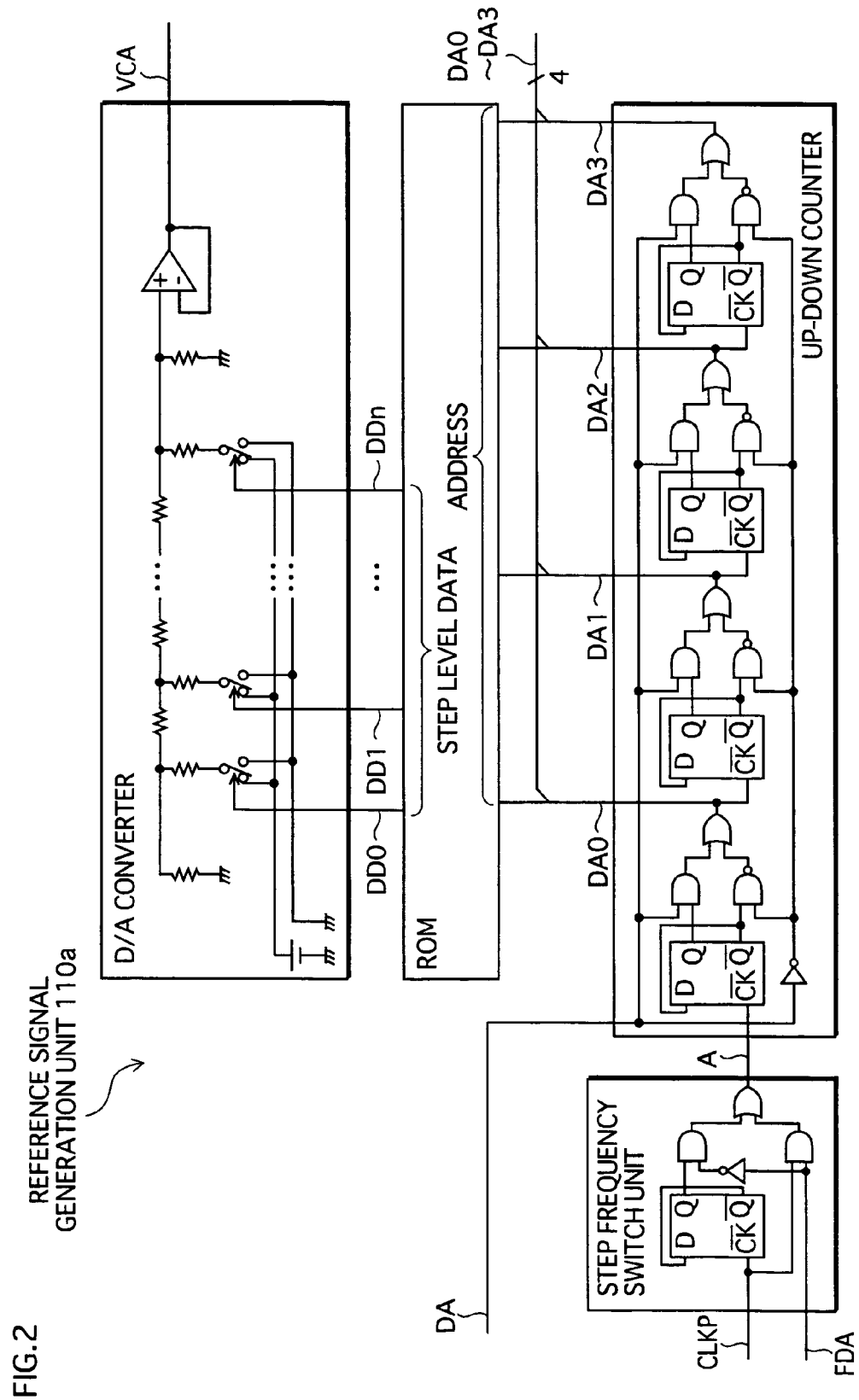
FIG. 2 is a functional block diagram showing a configuration of a reference signal generation unit.

FIG. 2 is a functional block diagram showing a detailed configuration of the reference signal generation unit 110a. As determined by a step frequency signal FDA, a step frequency switch unit chooses between a clock signal CLKP and a signal obtained by dividing the clock signal CLKP by two. The step frequency switch unit sends the chosen signal to an up-down counter as a signal CP which provides one pulse per step of the staircase signal.

The up-down counter counts up or down the signal CP according to an up-down signal DA, and outputs a count value DA0–DA3 to a ROM (Read Only Memory). The ROM stores data indicating, for example, each step level of an approximate sinusoidal staircase signal in advance, and outputs to a D/A converter the step level data DD0, DD1, . . . , DDn which is identified by the count value DA0–DA3 of the up-down counter. The D/A converter converts this step level data into an analog voltage, and outputs it as an approximate sinusoidal staircase signal VCA.

Since the up-down counter, the ROM, and the D/A converter are all common, well-known circuits, their detailed explanation is omitted here.

Figure 3:
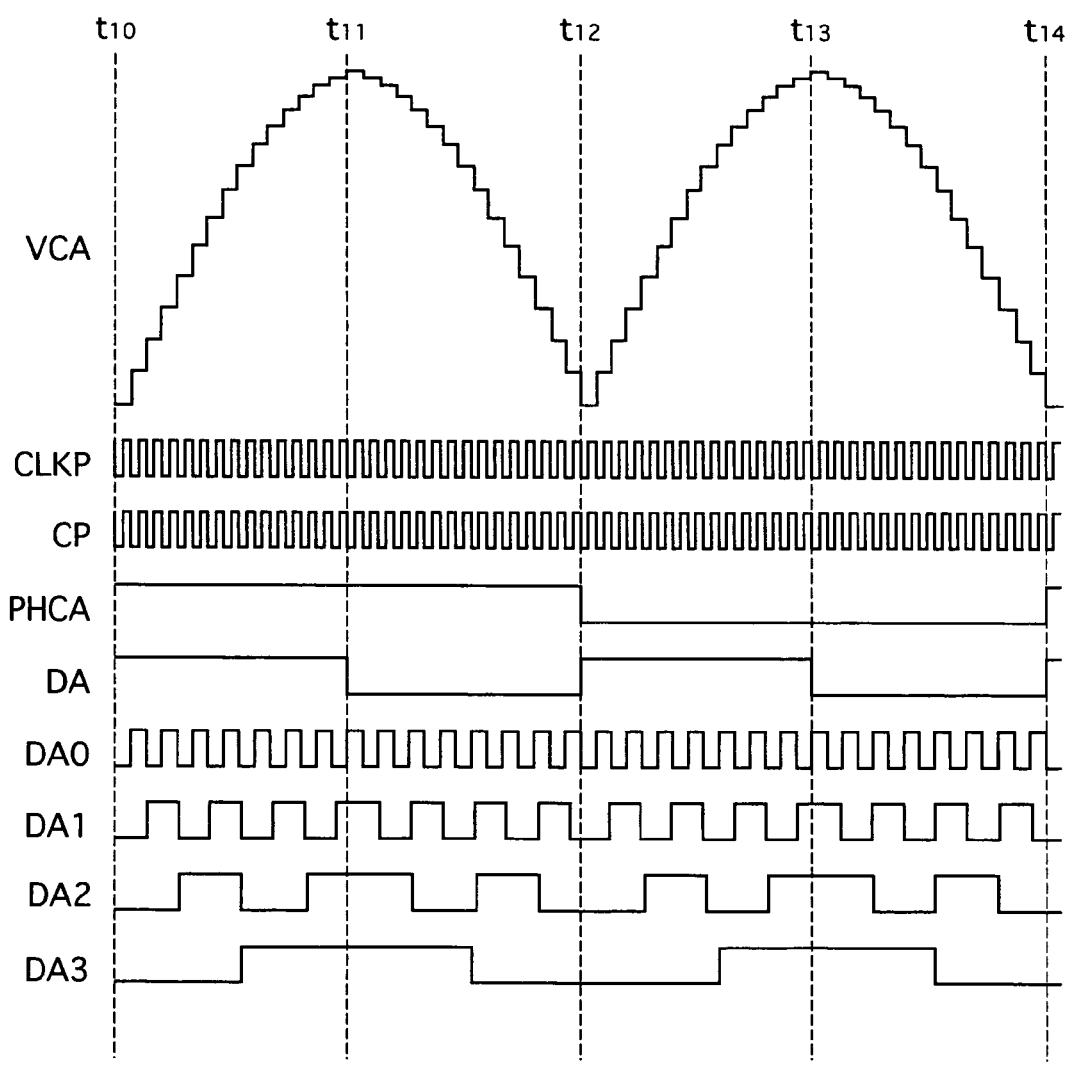
FIG. 3 is a waveform chart illustrating chronological changes of main signals in the reference signal generation unit.

FIG. 3 is a waveform chart showing chronological changes of main signals in the reference signal generation unit 110a, and illustrates the case in which the level of the step frequency signal FDA (not shown) is high by an example.

From time t10 to time t11, the clock signal CLKP, a high-level polarity signal PHCA, and a high-level up-down signal DA are provided. According to these signals, the up-down counter outputs the count value DA0–DA3 which increases from 0 to 15. The D/A converter digital-to-analog converts the step level data DD0–DDn read out from the ROM, and thereby generates one-fourth cycle of the approximate sinusoidal staircase signal VCA.

From time t11 to time t12, a low-level up-down signal DA is provided. The up-down counter outputs the count value DA0–DA3 which decreases from 15 to 0. The D/A converter generates the next fourth cycle of the approximate sinusoidal staircase signal VCA.

At time t12, as soon as the count value DA0–DA3 reaches zero, the polarity signal PHCA switches to a low level.

From time t12 to t14, the rest of the cycle (i.e. the second half cycle) of the approximate sinusoidal staircase signal VCA is generated while the polarity signal PHCA is kept at the low level.

Note here that, when the level of the step frequency signal FDA is low, the signal CP will be a signal obtained by dividing the clock signal CLKP by two. In this case, the generated approximate sinusoidal staircase signal VCA has half the frequency of the one illustrated in FIG. 3. Here, the polarity signal PHCA and up-down signal DA shall be respectively adjusted by an external circuit (not shown) in advance so that each has an appropriate frequency, and then provided.

1.3 SR Prohibition unit 115a

Figure 4:
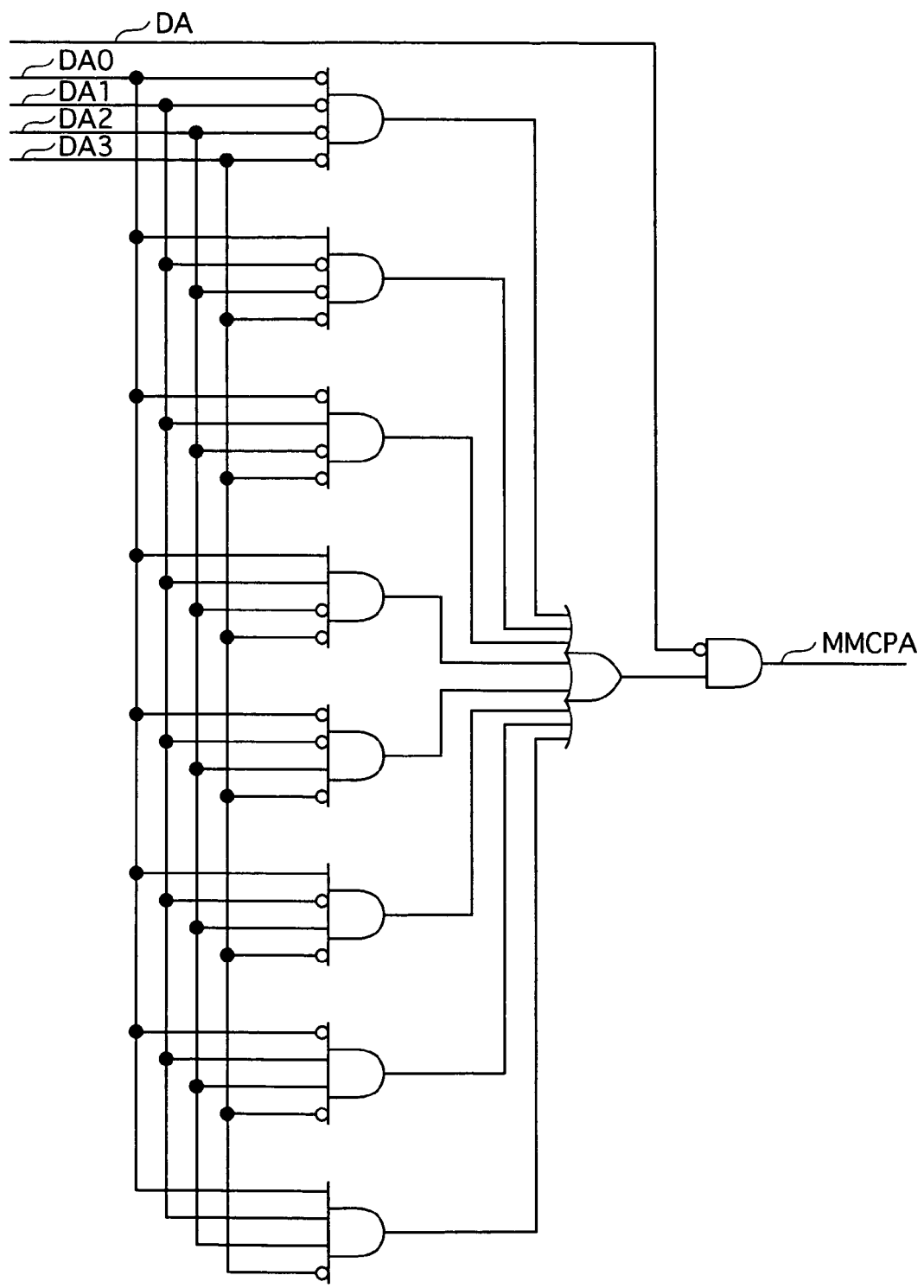
FIG. 4 is a functional block diagram showing a detailed configuration of a synchronous rectification prohibition unit.

FIG. 4 is a functional block diagram showing a detailed configuration of the SR prohibition unit 115a. The SR prohibition unit 115a outputs a synchronous rectification prohibition signal (hereafter, SR prohibition signal) MMCPA based on the count value DA0–DA3 and the up-down signal DA, at least for a period of time while the count value DA0–DA3 is decreasing. According to this specific example of FIG. 4, the SR prohibition signal MMCPA is outputted when the up-down signal DA is in a phase of a counting-down (i.e. low level) as well as the count value DA0–DA3 is between 7 and 0.

Figure 5:
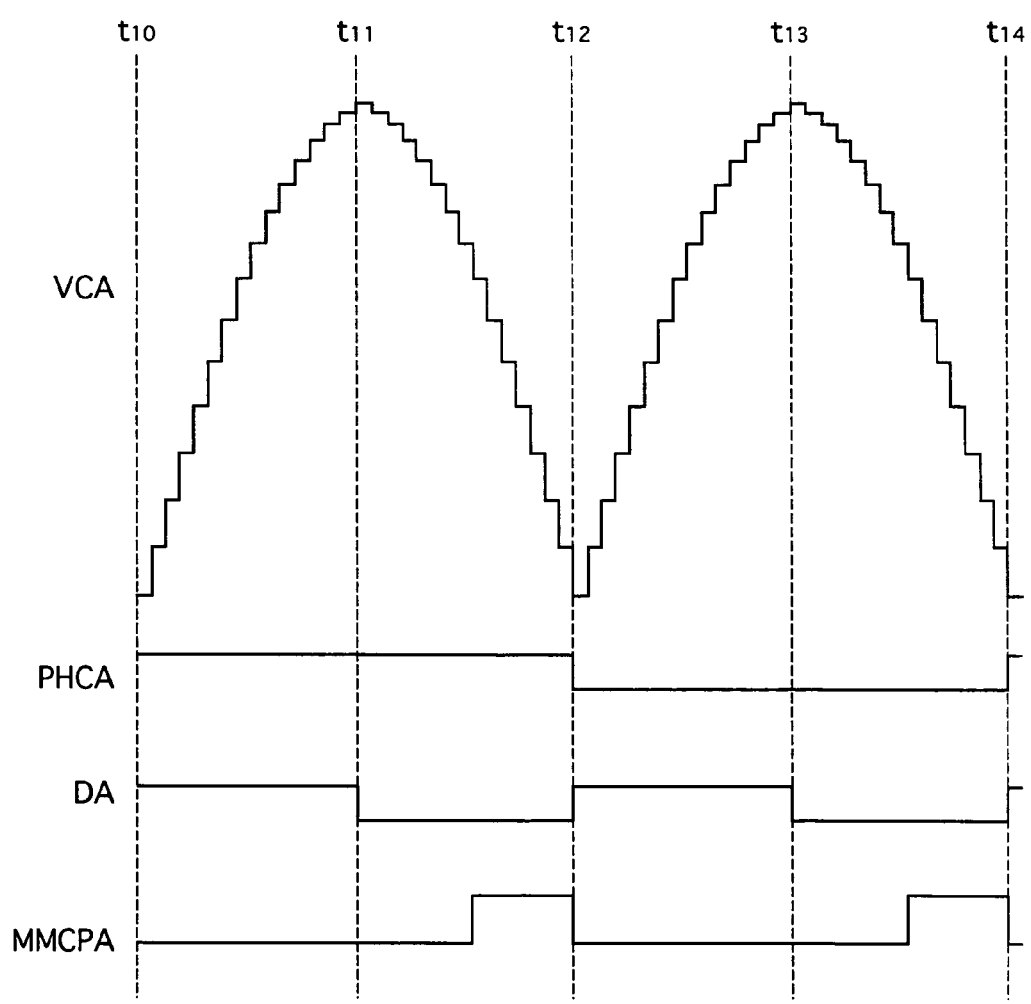
FIG. 5 is a waveform chart illustrating chronological changes of main signals relevant to prohibition control over the synchronous rectification.

FIG. 5 is a waveform chart illustrating chronological changes of main signals relevant to the prohibition control over the synchronous rectification. The figure presents the SR prohibition signal MMCPA along with some of the signals shown in FIG. 3. As can be seen in FIG. 5, the SR prohibition signal MMCPA is outputted when the staircase signal VCA is decreasing at a relatively rapid rate.

1.4 PWM Control Operation on Coil Current

The following explains the details of operations for the coil current supply and the regeneration control, which are performed by a cooperation of the PWM reference signal generation unit 1, the reference signal generation unit 110a, the SR prohibition unit 115a, the PWM control unit 120a, the bridge rectification circuit 130a and the supply current measurement unit 140a.

First, the case when the synchronous rectification is carried out is described.

Figure 6:
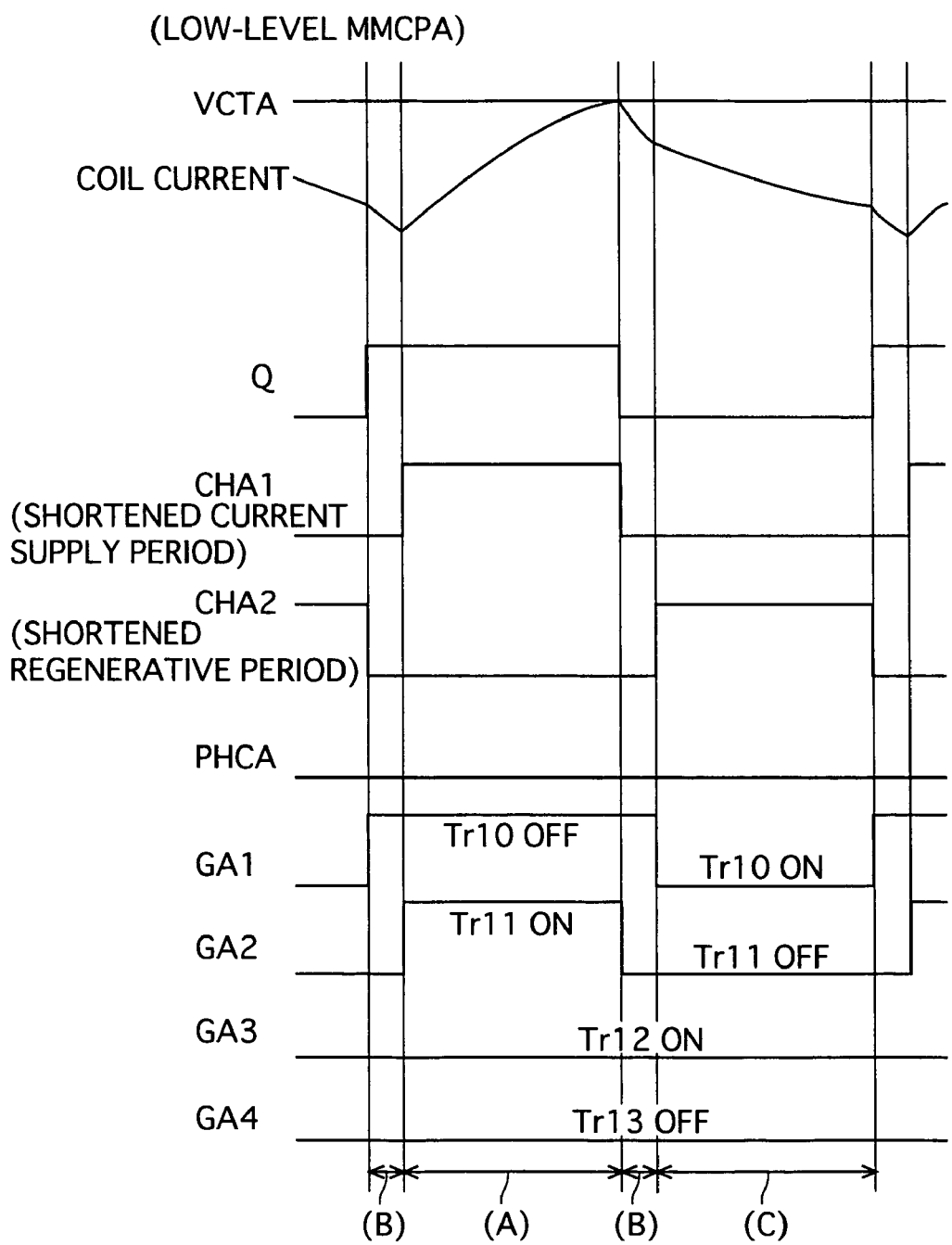
FIG. 6 is a waveform chart illustrating chronological changes of main signals relevant to PWM control.

FIG. 6 is a waveform chart showing chronological changes of main control signals relevant to the control over the coil current when the synchronous rectification is carried out. The figure illustrates the case when the polarity signal PHCA is low level and the SR prohibition signal MMCPA is also low level.

The PWM reference signal generation unit 1 generates a PWM reference signal SETF (not shown), which indicates the start of the period for current supply to the coil, in a predetermined cycle.

The flip-flop 5 is set in sync with a trailing edge of the PWM reference signal SETF. When the supply current to the coil exceeds the current represented by the staircase signal VCA, the comparator 4 outputs a signal to reset the flip-flop 5. The level of a supply instruction signal Q outputted by the flip-flop 5 indicates either a current supply period (high level Q) or a regenerative period (low level Q)

The flow-through protection logic unit 7 generates a signal CHA1 indicating a shortened current supply period as well as a signal CHA2 indicating a shortened regenerative period. The energization logic unit 6 outputs respective gate signals GA1–GA4 according to the signals CHA1 and CHA2 and the polarity signal PHCA.

Note here that the gate signals GA1 and GA3 are negative logic signals, each of which brings a corresponding transistor into conduction when the signal is low level. On the other hand, the gate signals GA2 and GA4 are positive logic signals, each of which brings a corresponding transistor into conduction when the signal is high level.

As shown in FIG. 6, one cycle of the supply instruction signal Q is divided into: (A) a shortened current supply period, (B) flow-through protection periods, and (C) a shortened regenerative period. Respective periods are determined by the combination of the levels of signals CHA1 and CHA2.

The polarity signal PHCA is constantly low level. The gate signal GA1 becomes low level only during the shortened regenerative period (therefore, the transistor 10 conducts only during this period), whereas the gate signal GA2 becomes high level only during the shortened current supply period (the transistor 11 conducts only during this period). In addition, the gate signal GA3 is constantly low level (the transistor 12 conducts constantly) and the gate signal GA4 is constantly low level (the transistor 13 constantly stays out of conduction).

Figure 7:
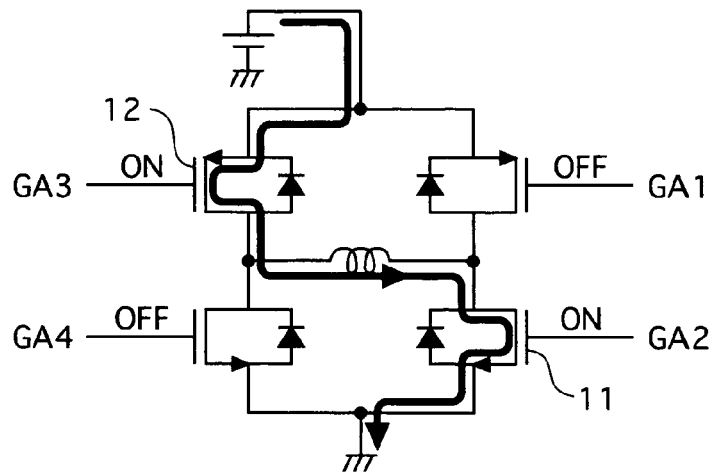
FIG. 7 is a conceptual diagram for explaining coil current paths which are formed according to control exerted by an energization logic unit.
Figure 7:
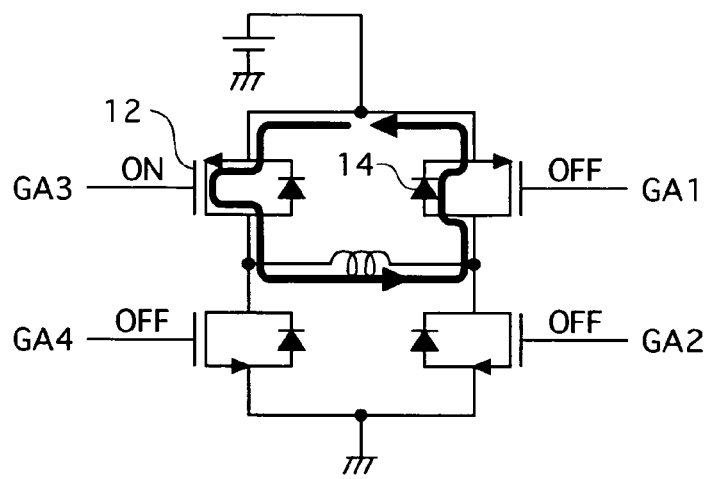
Figure 7:
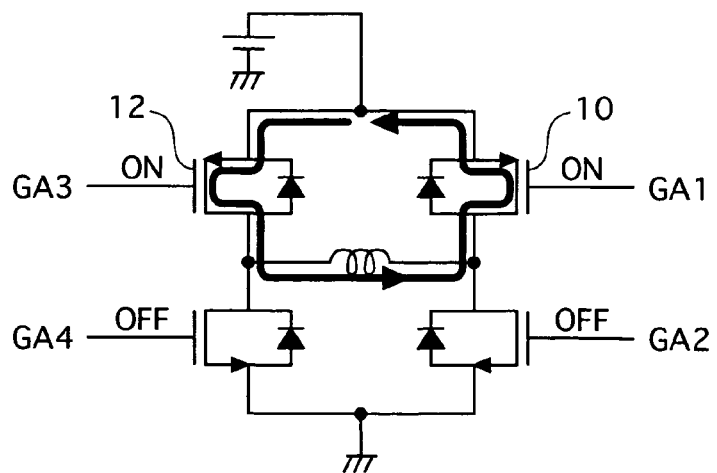

FIG. 7 is a conceptual diagram illustrating coil current paths formed during the above-mentioned periods, according to the control exerted by the energization logic unit 6.

Path A is formed during the shortened current supply period. A current is supplied to the coil along Path A, and the supply current progressively increases.

Once the supply current exceeds the current represented by the staircase signal VCA, the period shifts to a flow-through protection period and Path B is formed. The regenerative current from the coil circulates along Path B passing through the flywheel diode 14 and the transistor 12, and then gradually decays.

In the shortened regenerative period, Path C is formed. The regenerative current from the coil gradually decays as circulating along Path C via the transistors 10 and 12. This state, in which the regenerative current circulates along Path C, is synchronous rectification.

The flow-through protection periods are provided so as not to bring both transistors 10 and 11 into conduction at the same time when the current path switches from one to the other, and thereby short the current power supply 8.

The above control operation is repeated every cycle of the PWM reference signal, and the coil current is controlled by the limit indicator, which is represented by the staircase signal VCA.

Second, the case when the synchronous rectification is not carried out is described.

Figure 8:
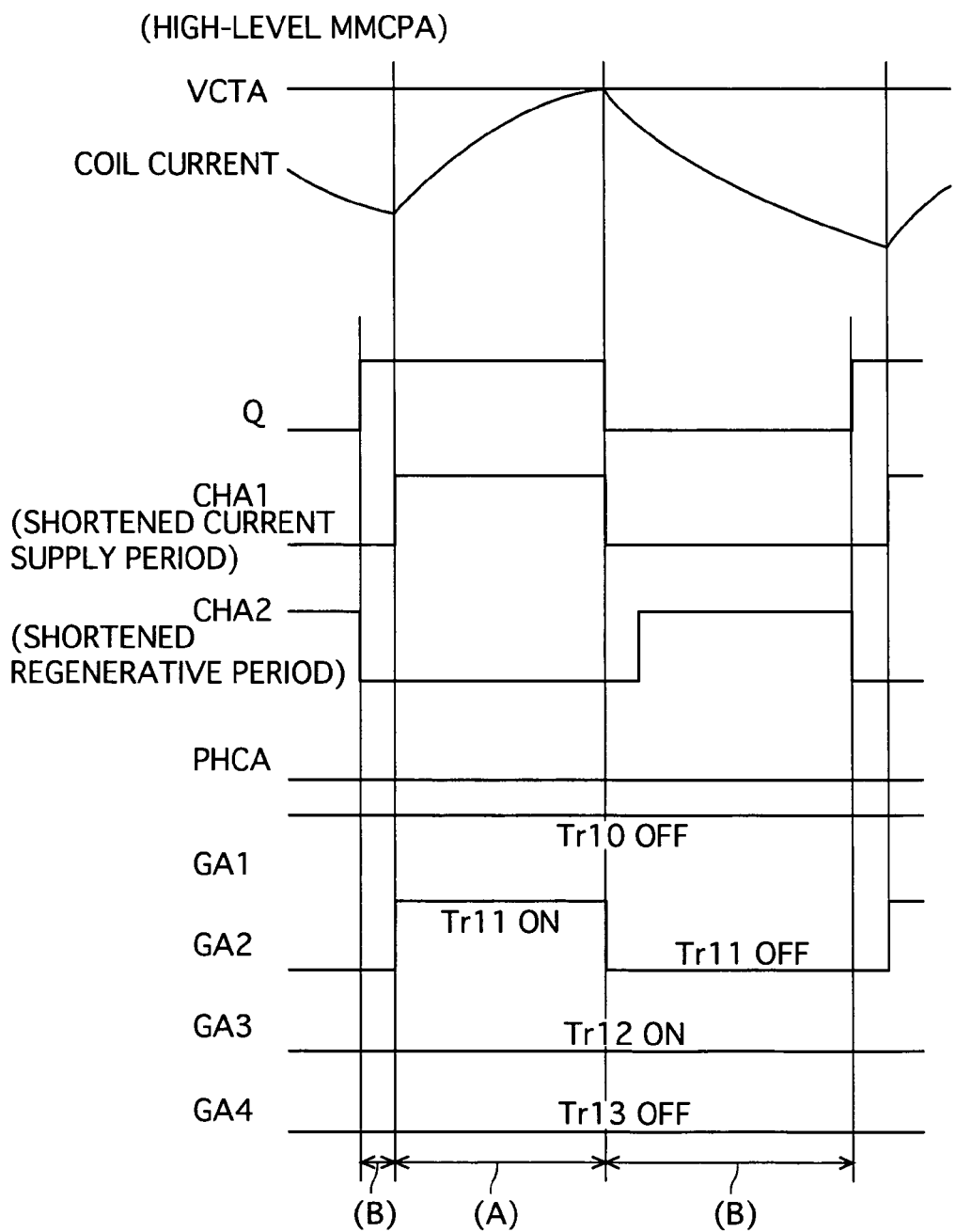
FIG. 8 is a waveform chart illustrating chronological changes of main signals relevant to the PWM control.

FIG. 8 is a waveform chart showing chronological changes of main control signals relevant to the control over the coil current when the synchronous rectification is not curried out. The figure illustrates the case when the polarity signal PHCA is low level while the SR prohibition signal MMCPA is high level.

In the case the synchronous rectification is not carried out, the SR prohibition signal MMCPA becomes high level and masks the signal CHA2. As a result, the level of the gate signal GA1 is maintained at a high level not only during the shortened current supply period and the flow-through protection periods but also during the shortened regenerative period, and therefore the transistor 10 does not conduct. Consequentially, the coil current circulates consistently along Path B through the flywheel diode 14 and gradually decays. Namely, the synchronous rectification is not carried out.

When the synchronous rectification is not carried out, the regenerative current is restrained through a voltage loss of the flywheel diode 14. Accordingly, energy stored in the coil 19a rapidly decreases and thereby the regenerative current quickly decays, compared to the case when the synchronous rectification is carried out.

When the polarity signal PHCA is high level, the same operation described above is carried out in a left-right mirror-reversed manner of the circuits shown in FIG. 7

According to the above-cited configuration, in order to prohibit the synchronous rectification, the SR prohibition signal MMCPA is outputted when the staircase signal VCA is decreasing at a relatively rapid rate. Herewith, the coil current rapidly decays during this period, and therefore the coil current follows the limit indicator closely. Furthermore, in the time other than the above period, the power supply efficiency is enhanced by mitigating the decay of the coil current.

1.5 Operation to Prohibit Synchronous Rectification

As mentioned above, when the synchronous rectification is not carried out, the regenerative current from the coil rapidly decays compared to when the synchronous rectification is carried out. This is explained using the following equivalent circuits.

Figure 9A:
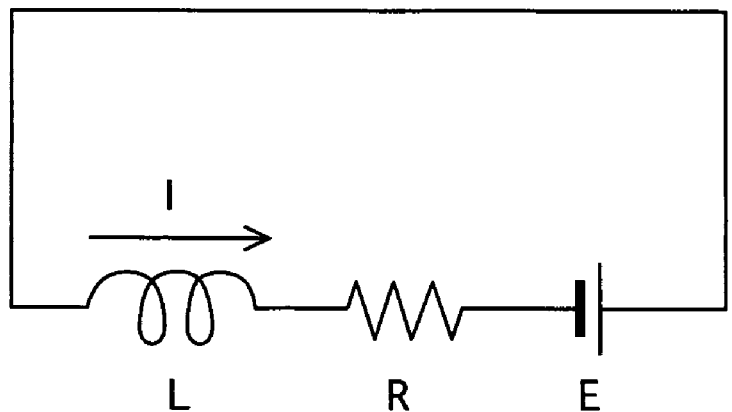
FIGS. 9A and 9B are equivalent circuits of regenerative current paths, in each of which a back electromotive force arising at the coil is taken into account.
Figure 9B:
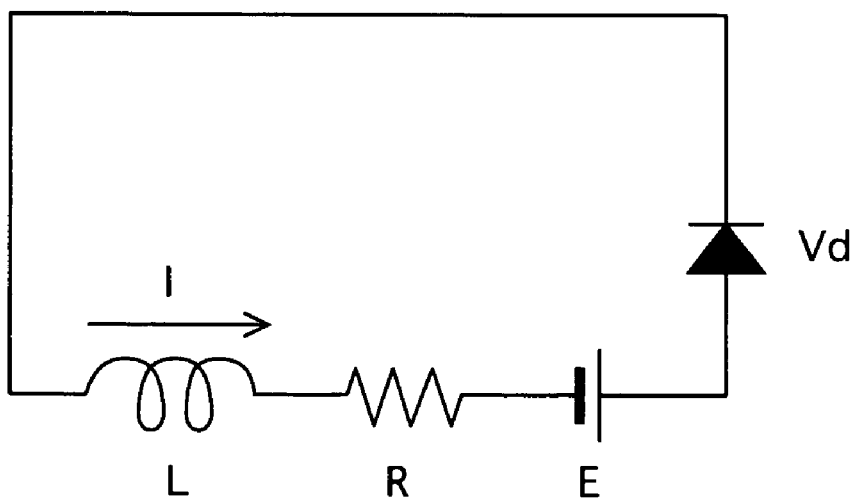

FIGS. 9A and 9B are equivalent circuits of Path C and Path B shown in FIG. 7, respectively. Both equivalent circuits are shown taking into account a back electromotive force arising at the coil due to the rotation of the motor, but in disregard of the on-resistance of the transistors. In these figures, I=coil current, L=reactance value of the coil, R=resistance of the coil, and E=back electromotive force arising at the coil due to a changing magnetic field which occurs as the rotor rotates. For the sake of simplicity, it is assumed that E is a constant as a function of the rotational speed of the motor.

Here, t=time with a base point (i.e. t=0) at which the current supply period switches to the regenerative period, $I_0$=coil current at t=0, $\tau$=L/R (time constant), and Vd=voltage loss by the flywheel diode. The coil current value Ia of the equivalent circuit in FIG. 9A, where the synchronous rectification is carried out, can be expressed with the following equation:

$$Ia=(I_0+E/R)\times\exp(-t/\tau)-E/R \quad (0\leq t) \quad \text{(Eq. 1)}$$

The coil current value Ib of the equivalent circuit in FIG. 9B, where the synchronous rectification is not carried out, is expressed with:

$$Ib=(I_0+(E+Vd)/R)\times\exp(-t/\tau)-(E+Vd)/R \quad (0\leq t) \quad \text{(Eq. 2)}$$

Figure 10:
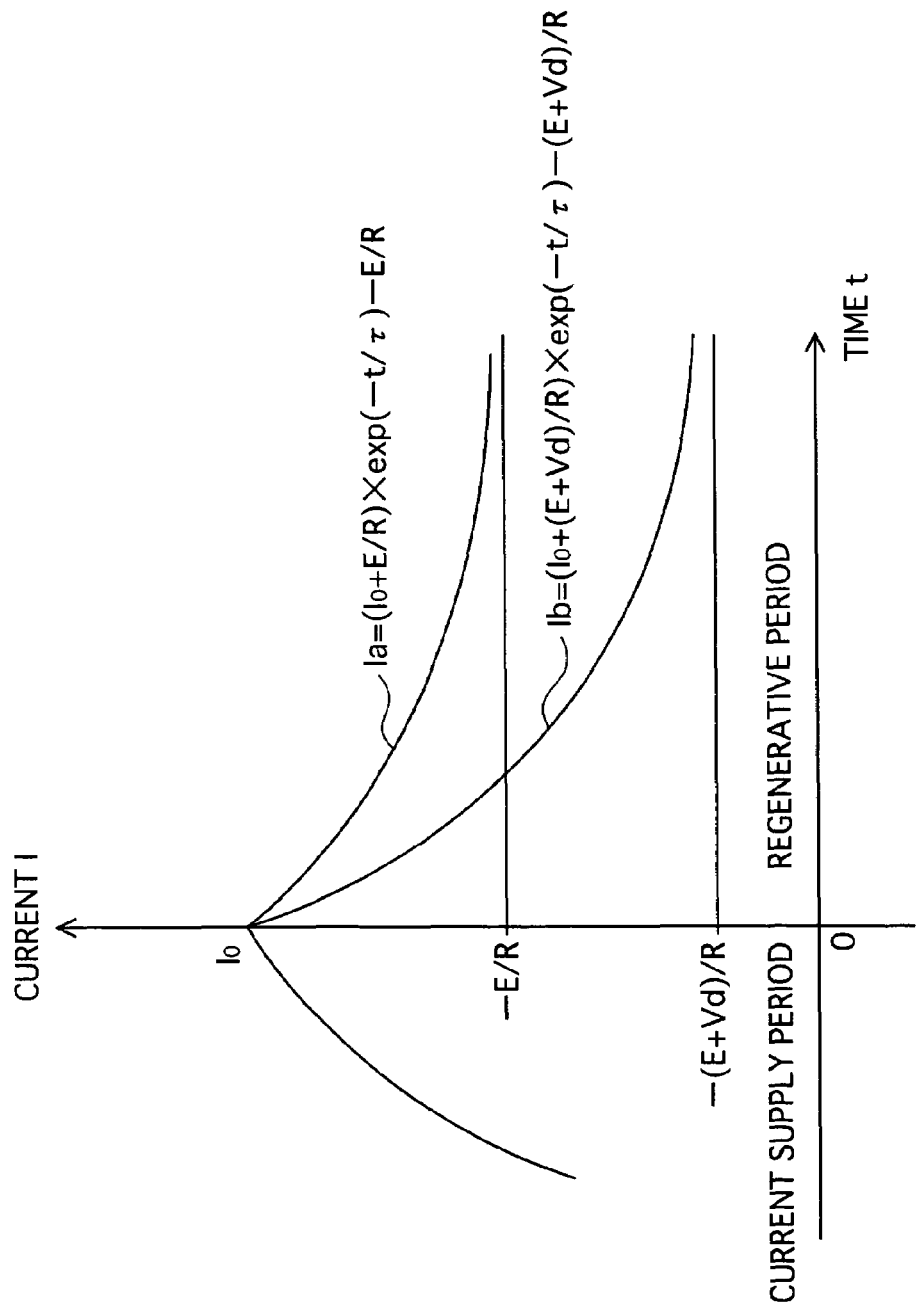
FIG. 10 is a graph showing decay characteristics of the regenerative currents as determined by current paths.

FIG. 10 is a graph showing examples of the decay characteristics of the regenerative currents expressed with Eq. 1 and Eq. 2, respectively. These examples are illustrated assuming that Vd is about 0.7 V and E is rather smaller than −Vd.

It can be observed from Eq. 1 that the value −(E/R) increases as the motor rotates at a higher speed, which results in a slowdown in the coil current decay. If the synchronous rectification is prohibited, the back electromotive force arising at the coil is offset by the voltage loss of the flywheel diode, and therefore the coil current decay will accelerate.

What this means is that prohibiting the synchronous rectification when the absolute value of the limit indicator is rapidly decreasing makes the coil current follow the limit indicator closely. The effect is prominent especially at the time of the high-speed rotation of the motor when the coil current decay slows down.

1.6 Review

In the view toward achieving a reduction in vibration and noise, suppose that the coil current is controlled to the limit indicator represented by, for example, an approximate sinusoidal staircase signal. In this case, by prohibiting the synchronous rectification, this stepping motor drive device makes the coil current decay rapidly during a period when the staircase signal is decreasing at a relatively rapid rate. Herewith, the coil current follows the limit indicator precisely. In the time other than the above period, on the other hand, the power supply efficiency is enhanced by carrying out the synchronous rectification and thereby mitigating decay of the coil current.

Thus, the coil current is precisely controlled to an intended waveform by providing implementation and prohibition periods of the synchronous rectification according to the decreasing rate of the staircase signal. This allows to achieve an adequate reduction in vibration and noise, which are induced when the motor is driven, as well as a good efficiency in the power supply.

In addition, the stepping motor drive device of the present invention exercises a PWM control on the supply current to the coil, using a current chopper method. This achieves lower power operation compared to the case where the current is supplied to the coil by voltage control.

Note that the supply current measurement unit 140a may be composed simply of a resistor, instead of the ON resistance adjustment circuit 24 and the transistor 23. Furthermore, the supply current measurement unit 140a does not have to include an operational amplifier 21.

2. Second Embodiment

A stepping motor drive device of the second embodiment of the present invention differs from the first embodiment in the configuration relevant to the SR prohibition signal MMCPA generation. The following mainly describes the differences of the second embodiment from the first embodiment.

2.1 Overall Configuration

Figure 11:
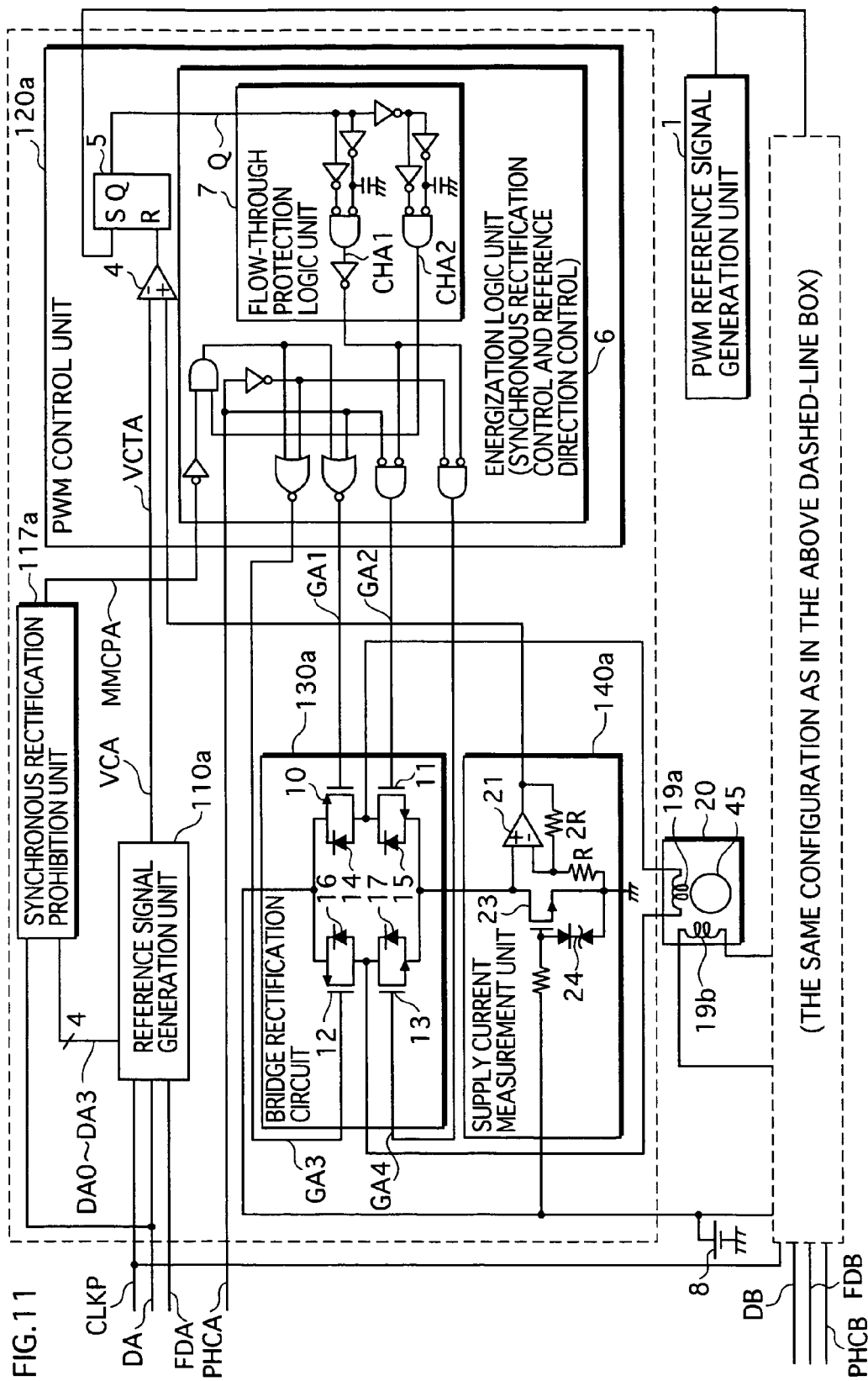
FIG. 11 is a functional block diagram showing an overall configuration of a stepping motor drive device according to the second embodiment.

FIG. 11 is a functional block diagram showing an overall configuration of the stepping motor drive device of the second embodiment. Compared to the first embodiment, a SR prohibition unit 117a is used, instead of the SR prohibition unit 115a.

The SR prohibition unit 117a is configured so as to vary the time portion of which the SR prohibition signal MMCPA is being outputted according to program signals PRGA0 and PRGA1 provided from outside.

2.2 SR Prohibition Unit 117a

Figure 12:
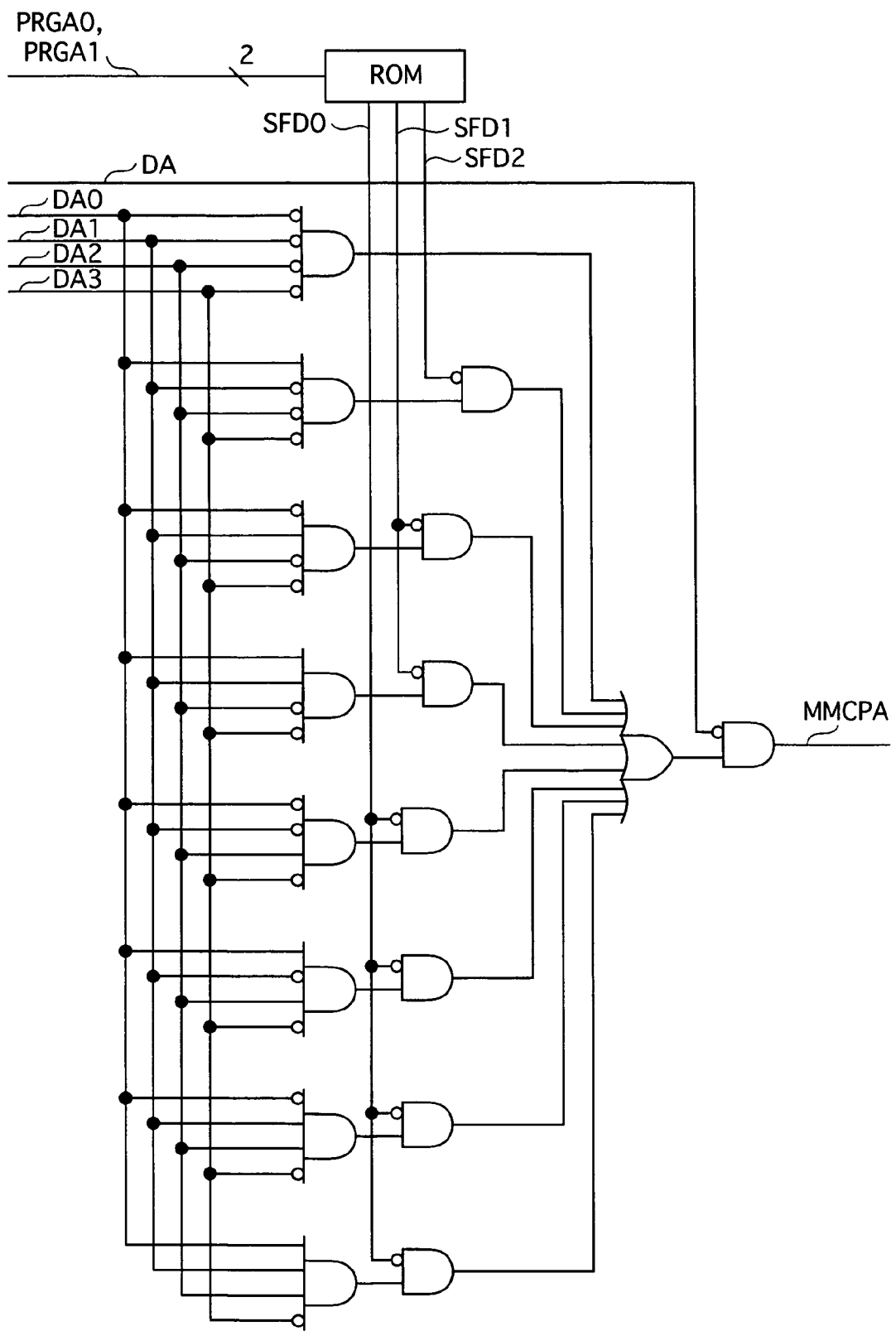
FIG. 12 is a functional block diagram showing a detailed configuration of another synchronous rectification prohibition unit.

FIG. 12 is a functional block diagram showing a detailed configuration of the SR prohibition unit 117a. When the count value DA0–DA3 is between 0 and 7, the SR prohibition unit 117a masks, using outputs SFD0, SFD1 and SFD2 from the ROM, some of the decoded signals, each of which corresponds to the count value DA0–DA3 of 0 to 7, respectively. Herewith, the SR prohibition unit 117a is able to vary the time portion of which the SR prohibition signal MHCPA is being outputted.

In the ROM, the contents of Table 1 for example may be prestored.

TABLE 1

| PRGA0, PRGA1 | SFD0, SFD1, SFD2 |
|---|---|
| 0, 0 | 0, 0, 0 |
| 0, 1 | 1, 0, 0 |
| 1, 0 | 1, 1, 0 |
| 1, 1 | 1, 1, 1 |

According to the above example, the program signals PRGA0 and PRGA1 have four combinatorial pairs: (0, 0), (0, 1), (1, 0) and (1, 1). Being provided with these combinatorial pairs of (0, 0), (0, 1), (1, 0) and (1, 1), the SR prohibition unit 117a outputs the SR prohibition signal MMCPA over the time portion in which the count value DA0–DA3 is decreasing from 7 to 0, from 3 to 0, from 1 and 0, and being at 0, respectively.

3. Third Embodiment

A stepping motor drive device of the third embodiment of the present invention differs from the first embodiment in that a unit for delaying the polarity signal is added. The following mainly describes the differences of the third embodiment from the first embodiment.

3.1 Overall Configuration

Figure 13:
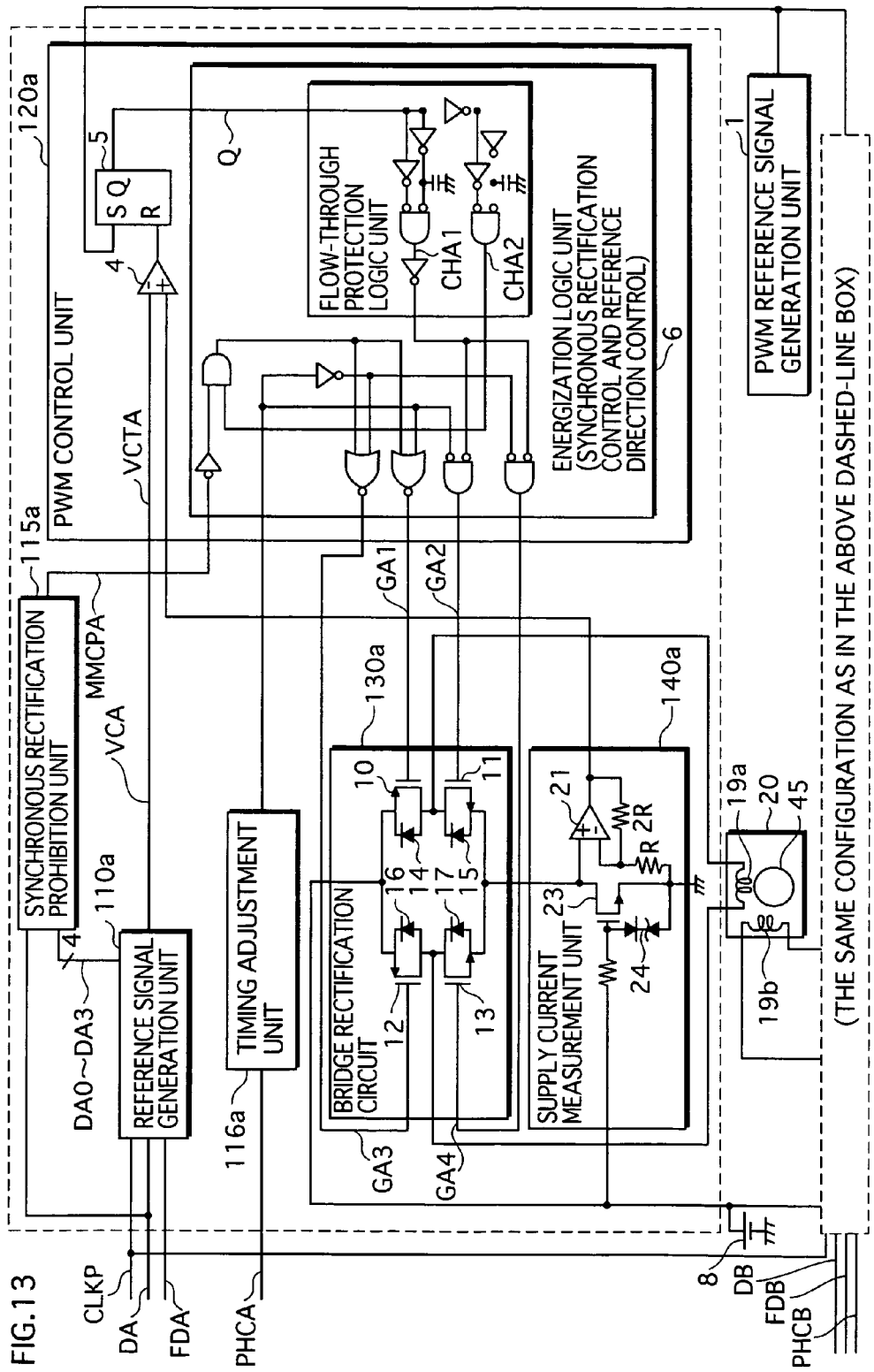
FIG. 13 is a functional block diagram showing an overall configuration of a stepping motor drive device according to the third embodiment.

FIG. 13 is a functional block diagram showing an overall configuration of a stepping motor drive device according to the third embodiment. Note that a stepping motor which is driven by the device, is also shown in the figure. This stepping motor drive device is configured by adding a timing adjustment unit 116a to the first embodiment (see FIG. 1). The timing adjustment unit 116a outputs the polarity signal PHCA, to the energization logic unit 6, with a delay of a specified period of time.

3.2 Timing Adjustment Unit 116a

Figure 14:
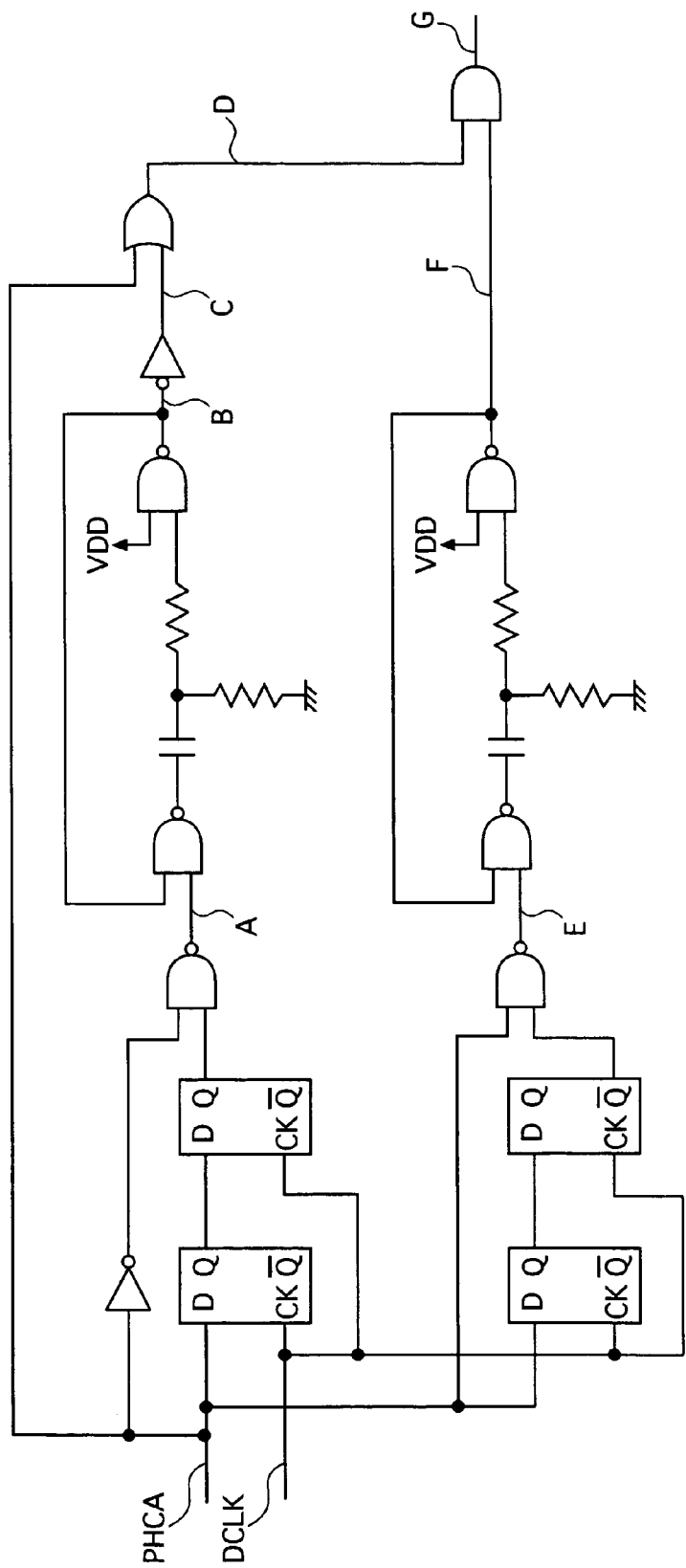
FIG. 14 is a functional block diagram showing a detailed configuration of a timing adjustment unit.

FIG. 14 is a functional block diagram showing a detailed configuration of the timing adjustment unit 116a. Being input the polarity signal PHCA and a delay signal DCLK, the timing adjustment unit 116a outputs a delayed polarity signal G.

The delay signal DCLK is a clock signal which has a cycle shorter than one pulse per step of the staircase signal VCA. For instance, the PWM reference signal outputted from the PWM reference signal generation unit 1 can be used as the delay signal DCLK. In FIG. 13, a signal line to supply the delay signal DCLK is omitted.

The timing adjustment unit 116a synchronously differentiates the leading edge and trailing edge of the polarity signal PHCA based on the delay signal DCLK in order to generate a signal A and signal E, respectively. The signal A is extended to generate a signal C, while the signal E is also extended to generate a signal F. Then, by synthesizing the signals C and F and the polarity signal PHCA, the timing adjustment unit 116a outputs the delayed polarity signal G.

Figure 15:
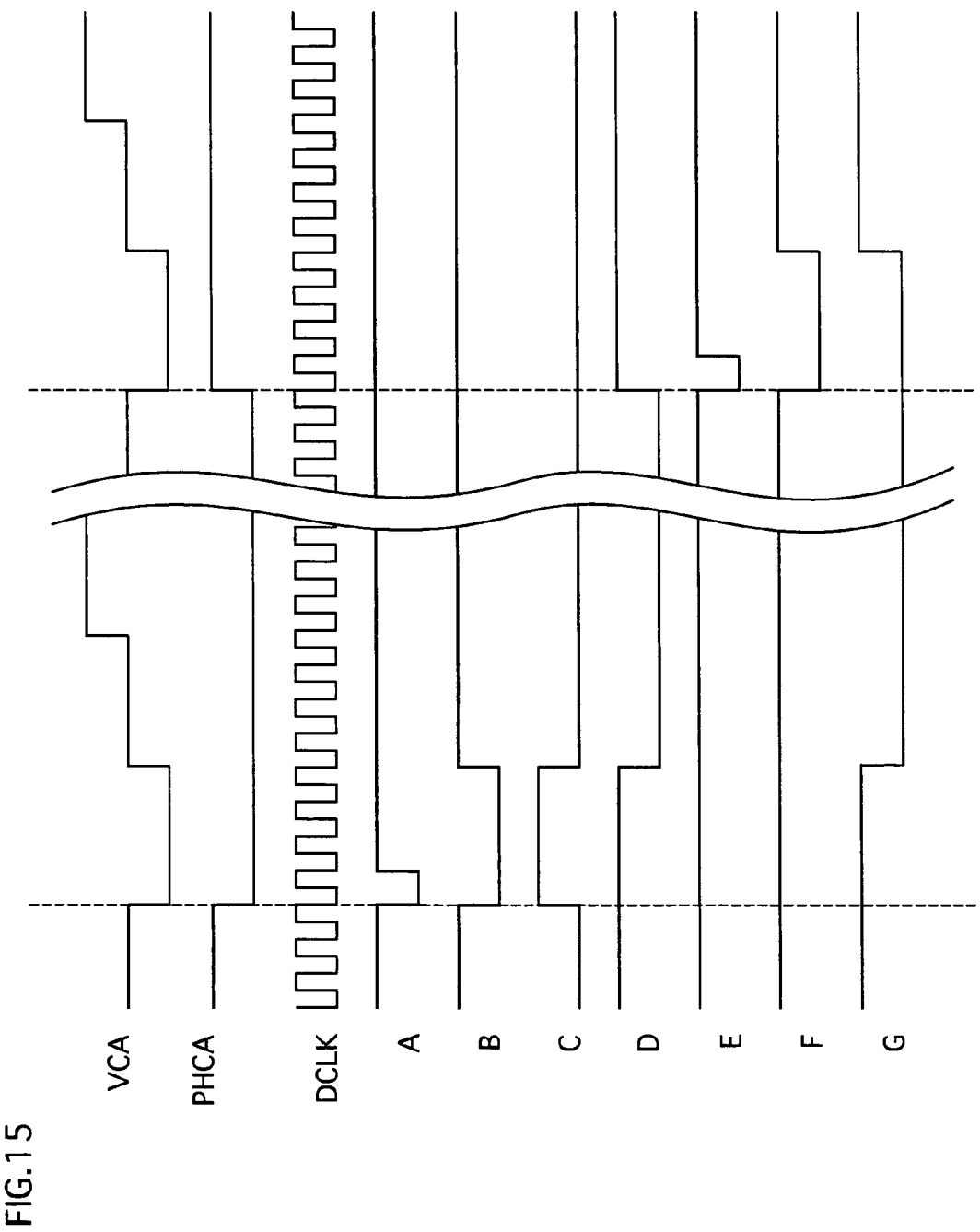
FIG. 15 is a waveform chart illustrating chronological changes of main signals in the timing adjustment unit.

FIG. 15 is a waveform chart illustrating chronological changes of main signals relevant to adjusting a timing of phase reversal. In this example, the output period of each of the signals C and F is made to largely match a time period of one step of the staircase signal VCA. This output period approximates a time period required for the level of the staircase signal VCA (i.e. the limit indicator of the coil current) to decrease by one step. As a result, the delayed polarity signal G, which is the polarity signal PHCA being delayed for the above time period, is obtained.

3.3 Effect of Delaying Polarity Signal

Figure 16A:
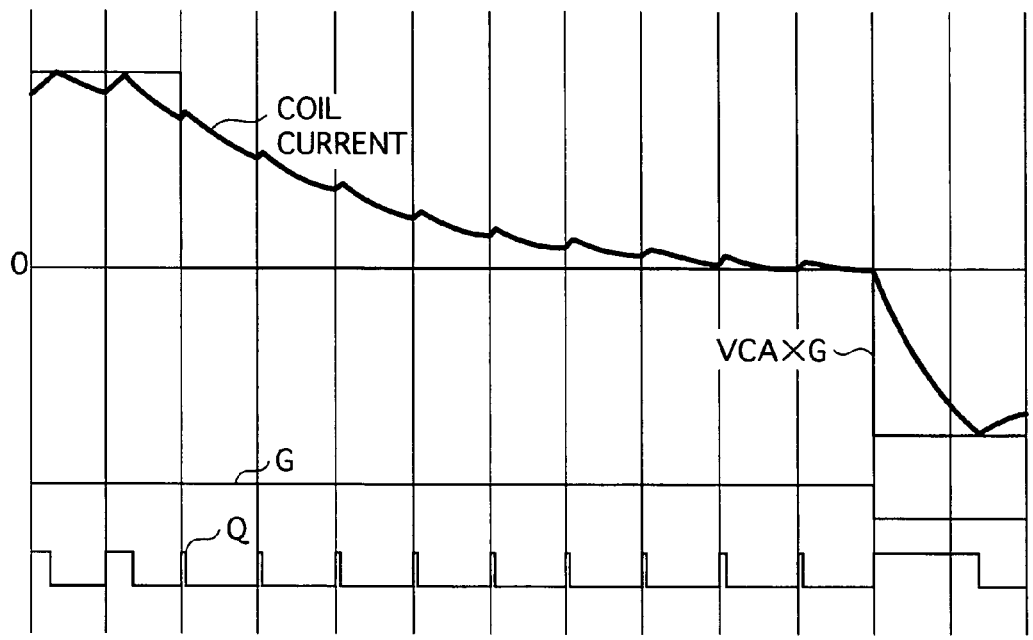
FIGS. 16A and 16B are conceptual diagrams showing an effect of a timing adjustment for reversing a reference direction of a coil current.
Figure 16B:
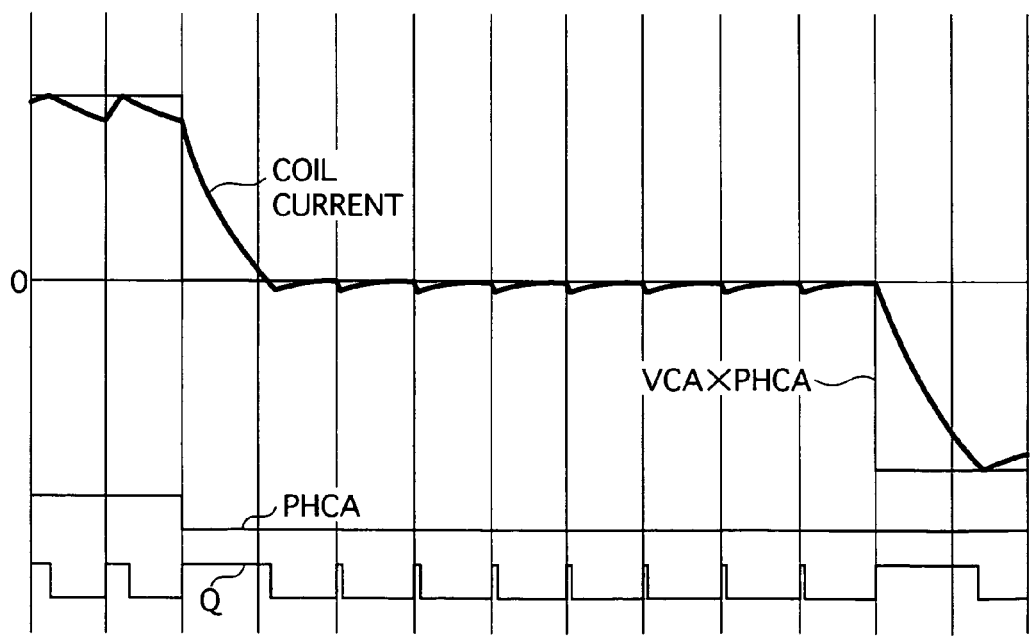

FIGS. 16A and 16B are conceptual diagrams illustrating the effect of delaying the polarity signal, and are waveform charts showing chronological changes of the coil currents. FIG. 16A depicts the case of using the delayed polarity signal G, and FIG. 16B depicts the case of using undelayed polarity signal PHCA. Note that each vertical line indicates a time point of the trailing edge of the PWM reference signal (not shown). The polarity signal PHCA shall reverse its phase at approximately the same time as the level of the staircase signal VCA reaches zero.

When the delayed polarity signal G or the polarity signal PHCA changes its sign, positive or negative, the reference direction (i.e. a current direction corresponding to the sign of a current value) reverses. Current limit indicators VCA×G and VCA×PHCA, each with a sign indicating the reference direction, are illustrated. The supply currents to the coils are respectively controlled according to the signed limit indicators VCA×G and VCA×PHCA.

In the case of using the undelayed polarity signal PHCA, a current supply from the power supply circuit starts, after the phase of the polarity signal PHCA has been reversed, from the time point of the first trailing edge of the PWM reference signal. This current supply is continued until the coil current starts flowing in the reverse direction of the regenerative current circulating at the start of the current supply, and reaches the limit indicator (i.e. zero) represented by the staircase signal VCA. The above operation is illustrated in FIG. 16B. In this case, the ripple factor of the coil current is large and a reduction in vibration and noise when the motor is driven is disturbed.

On the other hand, in the case of using the delayed polarity signal G, the reference direction is reversed when the regenerative current has come sufficiently close to zero. Therefore, compared to the case using the polarity signal PHCA, the ripple factor of the coil current is kept small. This operation is illustrated in FIG. 16A. In this case, vibration and noise induced when the motor is driven can be adequately reduced.

Along with use of the delayed polarity signal G, it can be also considered to stop the current supply to the coil during the period when the level of the staircase signal VCA is zero. Such a control can be exercised using for instance a decode circuit and a gate circuit. Here, the decode circuit outputs a signal for prohibiting the current supply when the count value DA0–DA3 is zero, and according to the supply-prohibiting signal, the gate circuit masks the PWM reference signal provided to the flip-flop 5. As this supply-prohibiting signal, a signal outputted from the top gate circuit shown in FIG. 4 may be used.

This configuration allows an improvement in the power supply efficiency by entirely stopping the current supply to the coil during the period when the level of the staircase signal VCA is zero.

3.4 Modification of Timing Adjustment Unit

Figure 17:
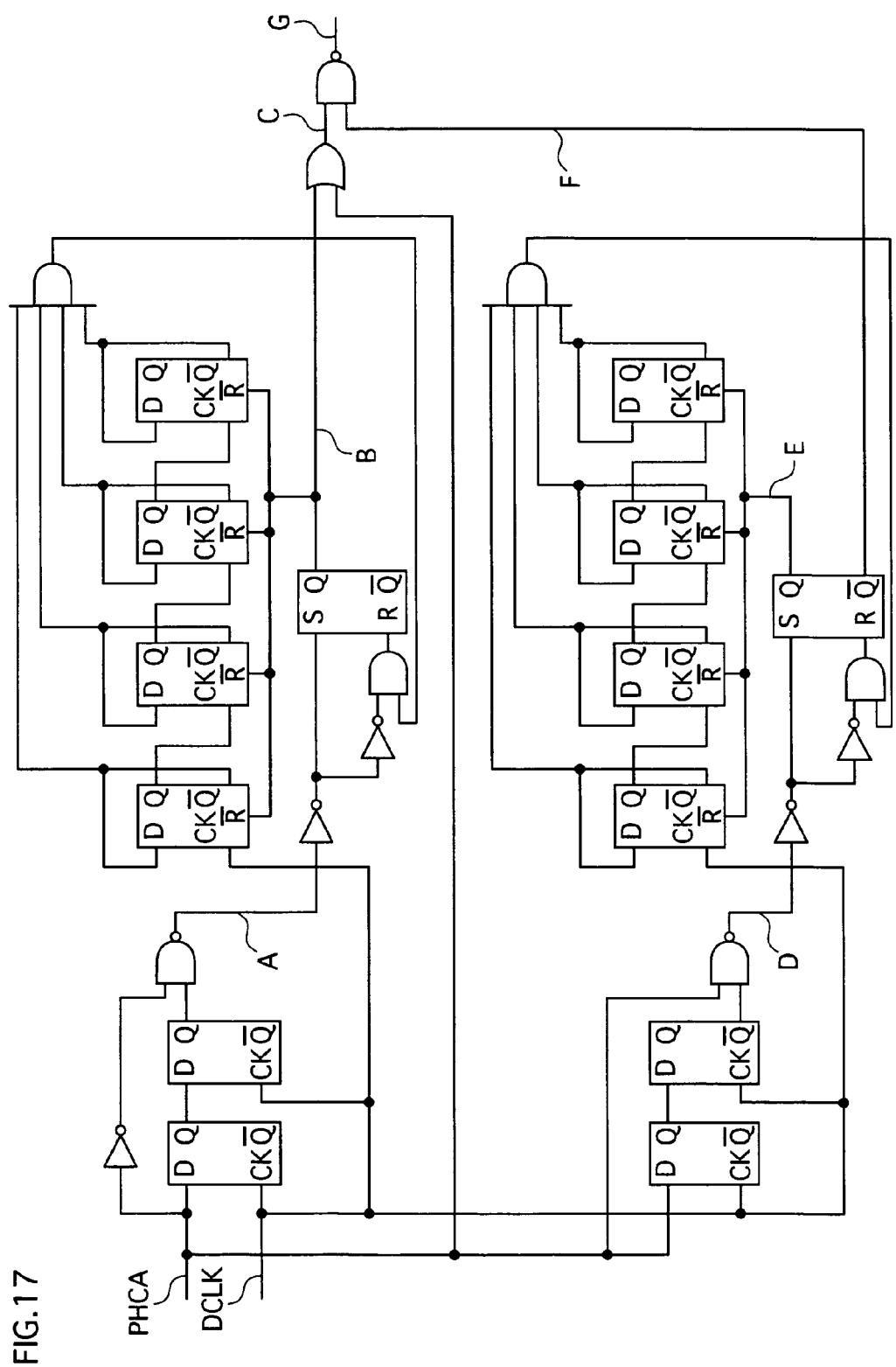
FIG. 17 is a functional block diagram showing another configuration of the timing adjustment unit.

FIG. 17 is a functional block diagram showing a modification of the timing adjustment unit shown in FIG. 14. In this modification, the circuits of FIG. 14, in one of which the signal C is generated by extending the signal A and in the other of which the signal F is generated by extending the signal E, are replaced with monostable multivibrators. Each of the monostable multivibrators is constructed using a digital circuit. This modified timing adjustment unit delays the polarity signal PHCA by operating in the same manner as the timing adjustment unit shown in FIG. 14.

4. Fourth Embodiment

A stepping motor drive device of the fourth embodiment of the present invention differs from the first embodiment in that a positive offset is systematically added to an output of the amplifier 21 used for measuring the supply current. The following mainly describes the differences of the fourth embodiment from the first embodiment.

4.1 Configuration for Adding Positive Offset

Figure 18A:
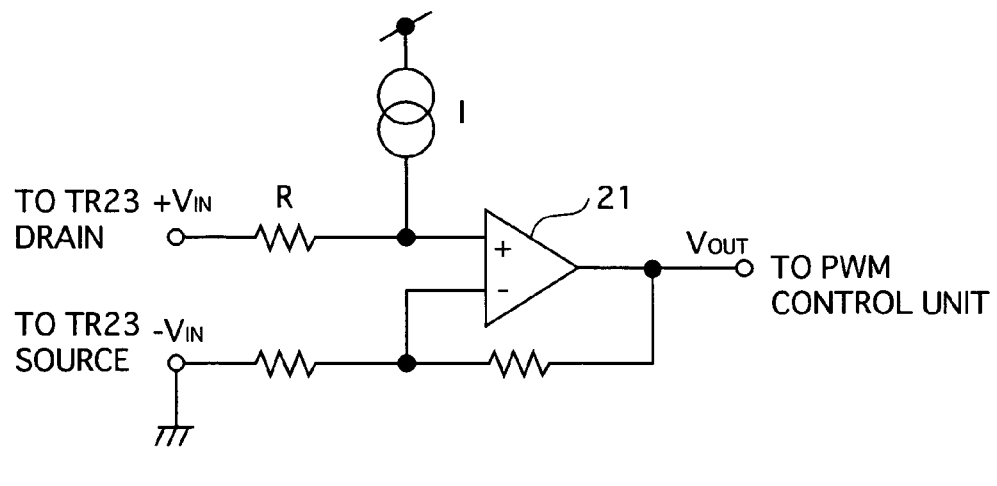
FIGS. 18A and 18B are functional block diagrams showing modifications of a supply current measurement unit.
Figure 18B:
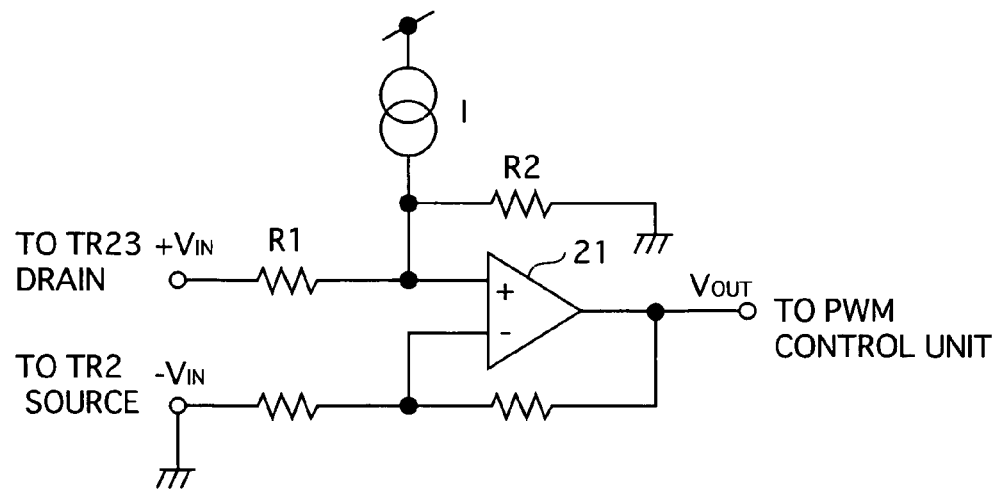

FIGS. 18A and 18B are functional block diagrams illustrating examples of configurations for systematically adding a positive offset to an output of the amplifier 21 used for measuring the supply current. Both configurations are formed by incorporating a constant current source and resistance to a noninverting input terminal of the amplifier 21 in the supply current measurement unit 140a (see FIG. 1).

A circuit having the configuration of FIG. 18A amplifies an input voltage, which is obtained by adding an offset voltage I×R to a voltage drop caused by the transistor 23, and outputs this amplified input voltage. A circuit having the configuration of FIG. 18B amplified an input voltage, which is obtained by adding an offset voltage $I \times (R_1+R_2)/(R_1 \times R_2)$ to the voltage drop caused by the transistor 23, and outputs this amplified voltage.

Figure 19:
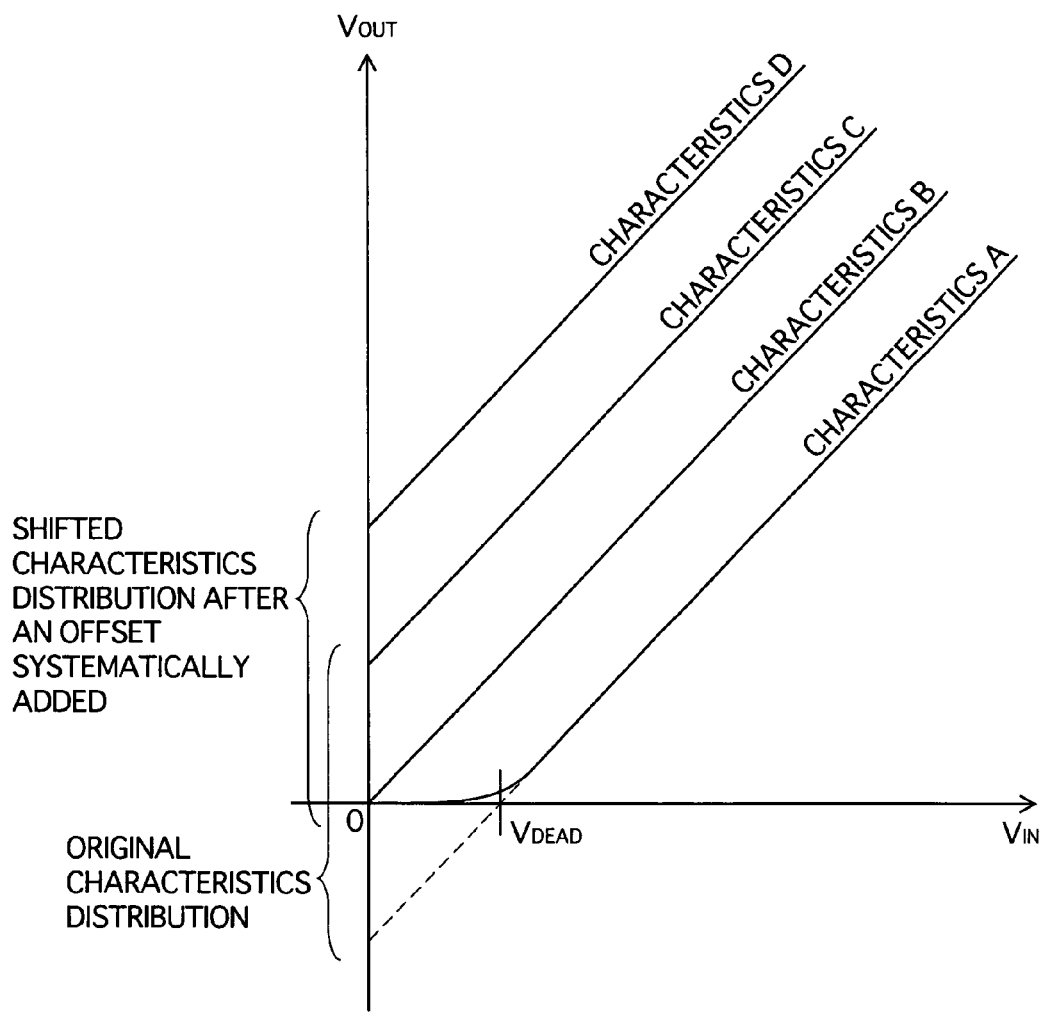
FIG. 19 is a graph showing a distribution of input-output characteristics of amplifiers.

FIG. 19 is a graph showing a distribution of input-output characteristics of amplifiers used for coil current measurement. Given that the offset of the amplifiers themselves is zero, the input-output characteristics of the amplifiers per se are distributed within the range from Characteristics A with a negative offset and Characteristics C with a positive offset, centering around Characteristics B passing through the origin. This is because the input-output characteristics are influenced by the individual differences among the amplifiers and temperature variation.

According to Characteristics A, an output $V_{OUT}$ is not obtained when an input $V_{IN}$ is less than $V_{DEAD}$. The output $V_{OUT}$ is a signal for resetting the flip-flop 5 for the PWM control and cutting off a transistor for the current chopping. If the PWM control is executed based on the coil current measured by an amplifier with Characteristics A, the transistor for the current chopping will not be cut off at least until the coil current exceeds a current corresponding to $V_{DEAD}$. In other words, the coil current cannot be controlled to be less than the current corresponding to $V_{DEAD}$.

Figure 20:
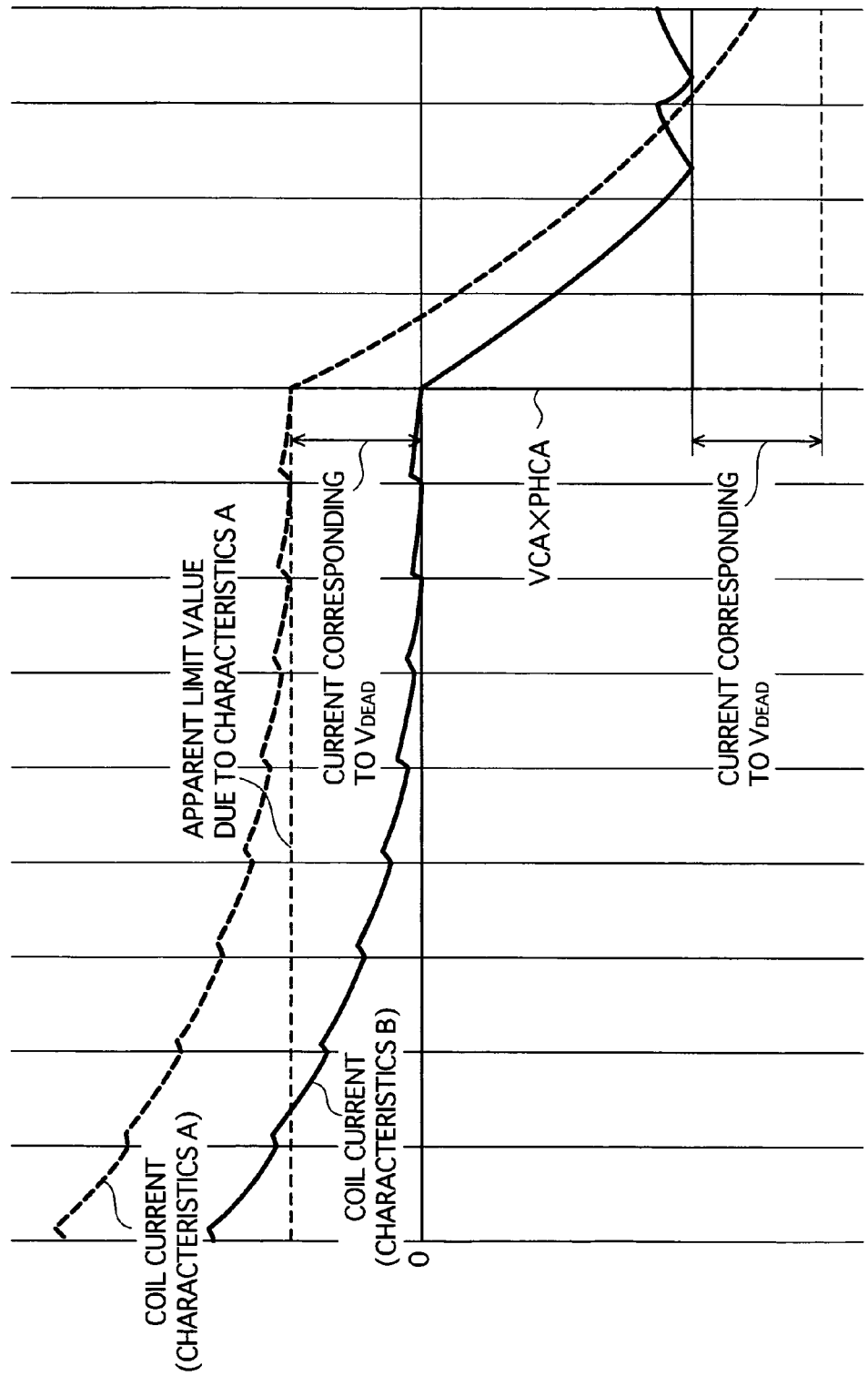
FIG. 20 is a waveform chart illustrating chronological changes of coil currents as determined by input-output characteristics of amplifiers used for supply current measurement.

FIG. 20 is a conceptual diagram for explaining a problem caused by this. This figure illustrates chronological changes of the coil currents in the cases of using amplifiers, each having Characteristics A or Characteristics B, for the coil current measurement.

In the case using an amplifier with Characteristics A, the coil current cannot be controlled to be less than the current corresponding to $V_{DEAD}$. Therefore, the coil current, as indicated by the heavy dotted line, is controlled by an apparent limit indicator, which is obtained by adding a value of the limit indicator, represented by the staircase signal VCA, to the current corresponding to $V_{DEAD}$. In this case, the ripple factor of the coil current increases since a drop arising in the apparent limit indicator becomes larger than usual at the time when the reference direction reverses. As a result, a reduction in vibration and noise when the motor is driven is disturbed.

On the other hand, in the case using an amplifier with Characteristics B, the output is obtained until the coil current reaches zero. Hence, the coil current, as indicated by the heavy line, is precisely controlled by the limit indicator represented by the staircase signal VCA. In this case, vibration and noise induced when the motor is driven can be adequately reduced.

Thus, if the distribution of the characteristics is shifted to the range of Characteristics B and D in FIG. 19 by systematically adding a positive offset to the output of the respective amplifiers, it can be avoided that amplifiers operate according to Characteristics A even under the worst conditions in individual differences among the amplifiers and temperature variation. As a result, vibration and noise induced when the motor is driven can be adequately reduced.

4.2 Modified Configuration for Adding Positive Offset

Figure 21:
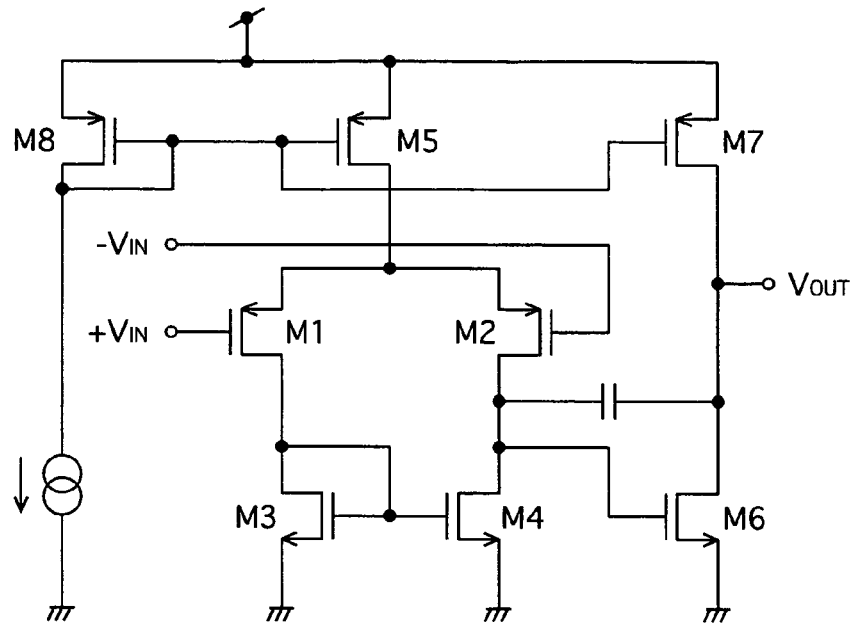
FIG. 21 is an equivalent circuit of an operational amplifier, in which a positive offset is added to the input-output characteristics.

FIG. 21 is a circuit diagram showing a different configuration for systematically adding a positive offset to the output of the amplifier. This circuit diagram exemplifies an equivalent circuit of an operational amplifier, which includes eight transistors M1–M8 as shown in the figure.

The operational amplifier is produced so that predetermined transistors have a length-to-width ratio of the gates, defined by a relational expression shown in FIG. 21. Herewith, a positive offset is added to the input-output characteristics of the amplifiers per se without incorporating a constant current source and resistance.

The present invention includes a configuration in which an operational amplifier produced in the above manner is used as the amplifier for supply current measurement.

5. Fifth Embodiment

A stepping motor drive device of the fifth embodiment of the present invention differs from the third embodiment (see FIG. 13) in: that the stepping motor drive device receives serial data which indicates levels of individual steps of the staircase signal, generates the staircase signal based on the serial data, and generates a reference signal from the staircase signal. The following mainly describes the differences of the fifth embodiment from the third embodiment.

5.1 Overall Configuration

Figure 22:
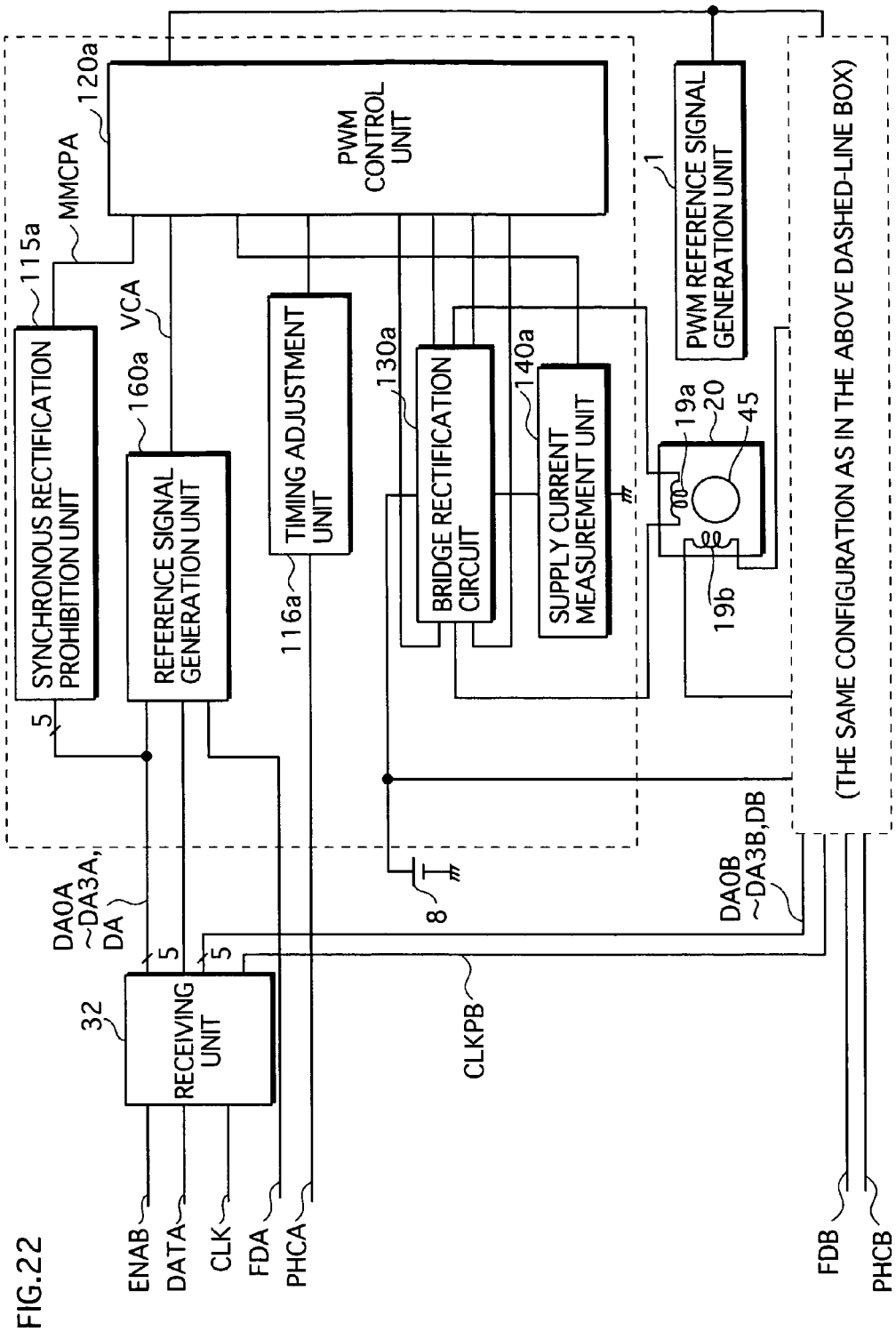
FIG. 22 is a functional block diagram showing an overall configuration of a stepping motor drive device according to the fifth embodiment.

FIG. 22 is a functional block diagram showing an overall configuration of a stepping motor drive device according to the fifth embodiment.

The components identical to those in the third embodiment are given the same reference numerals or symbols, and the explanation for these components is omitted. In addition, since the same components are provided for respective coils, the following presents components for the first coil 19a only as a representative example, leaving out the description of components for other coils.

The stepping motor drive device is composed of a PWM reference signal generation unit 1, a receiving unit 32, a reference signal generation unit 160a, a SR prohibition unit 115a, a timing adjustment unit 116a, a PWM control unit 120a, a bridge rectification circuit 130a, a supply current measurement unit 140a, and a power supply 8.

Under the control of a unit time signal ENAB used for signal reception control and a bit sync signal BCLK, the receiving unit 32 receives serial data DATA indicating the levels of individual steps of the staircase signal with respect to each coil. Then, the receiving unit 32 converts the received serial data DATA into parallel data. In addition, the receiving unit 32 generates a clock signal providing one pulse per step of the staircase signal, and provides the clock signal and the parallel data to the reference signal generation unit 160a corresponding to the coil.

The reference signal generation unit 160a is configured by taking off the step frequency switch unit, the up-down counter and the ROM from the reference signal generation unit 110a. Thus, the reference signal generation unit 160a is practically a D/A converter. Being provided, from the receiving unit 32, with the parallel data indicating the levels of individual steps of the staircase signal, the reference signal generation unit 160a digital-to-analog converts the parallel data with respect to each pulse per step of the staircase signal, and generates the staircase signal VCA.

5.2 Serial Data

Figure 23:
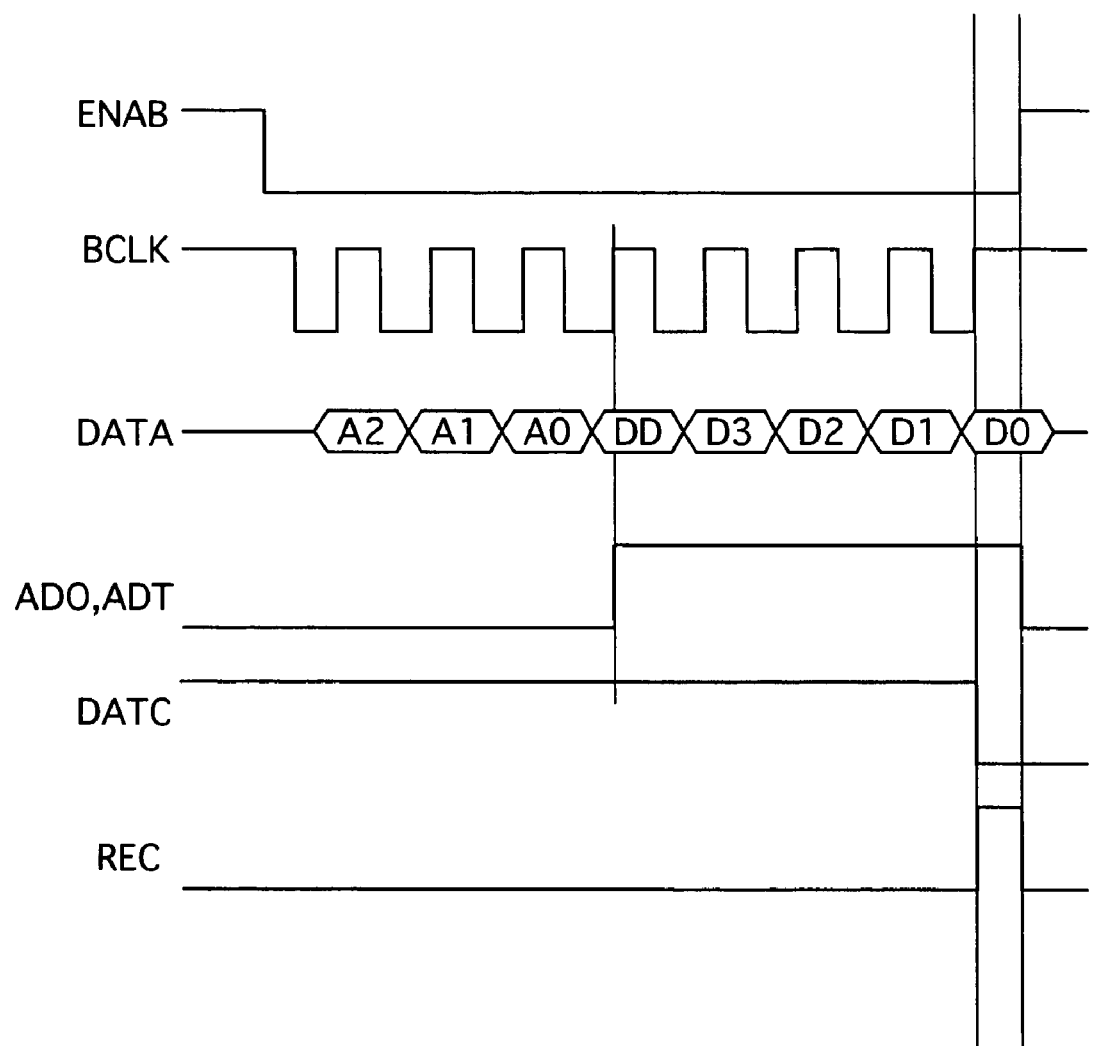
FIG. 23 is a waveform chart illustrating chronological changes of receiving signals and main signals in a receiving unit.

FIG. 23 is a timing chart showing one unit of the serial data received by the receiving unit 32. This unit corresponds to one step of the staircase signal for one coil. For individual coils, the serial data regarding individual steps of the staircase signal is represented in such units. The serial data is received as a series of these units.

One unit of the serial data DATA is made up of eight bits, with the first three bits for an address A2–A0 identifying a coil, the following bit of an increase/decrease direction bit DD, and the remaining four bits for data D3–D0 showing a step level.

Note that FIG. 23 also shows chronological changes of main signals in the receiving unit 32, in timing with the signal reception.

5.3 Receiving Unit 32

Figure 24:
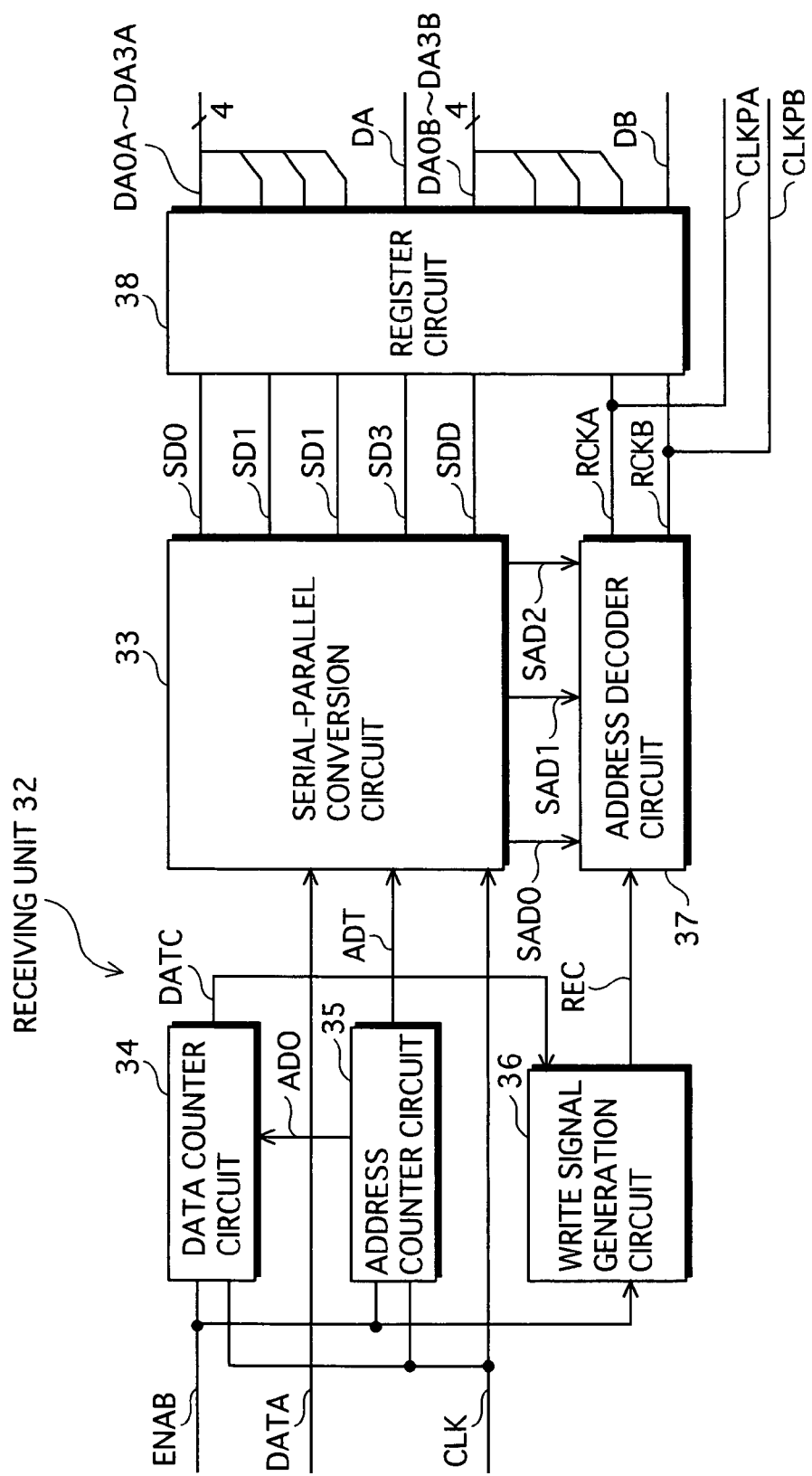
FIG. 24 is a functional block diagram showing a detailed configuration of the receiving unit.

FIG. 24 is a functional block diagram showing a detailed configuration of the receiving unit 32. The receiving unit 32 is composed of an address counter circuit 35, a data counter circuit 34, a serial-parallel conversion circuit 33, a write signal generation circuit 36, an address decoder circuit 37, and a register circuit 38.

Figure 25:
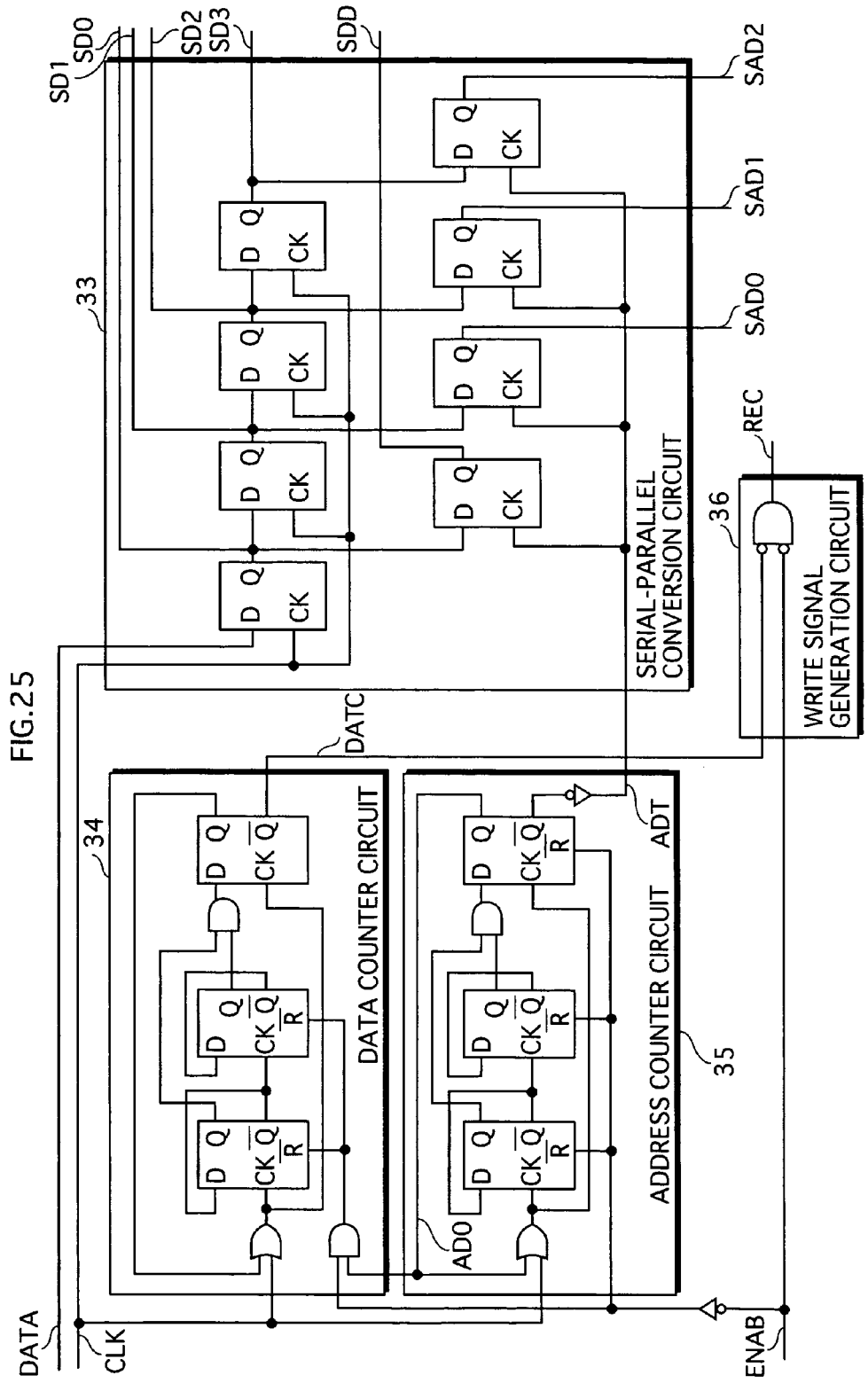
FIG. 25 is a functional block diagram showing a detailed configuration of an address counter circuit, a data counter circuit, a serial-parallel conversion circuit, and a write signal generation circuit.

FIG. 25 is a functional block diagram showing detailed configuration of the address counter circuit 35, the data counter circuit 34, the serial-parallel conversion circuit 33, and the write signal generation circuit 36.

The address counter circuit 35 outputs address completion signals ADO and ADT by counting the first four bits of the bit sync signal BCLK for the respective units of the serial data. These address completion signals AD0 and ADT indicate that the reception of the first four bits of the serial data has completed.

The data counter circuit 34 is triggered by the address completion signal ADO. The data counter circuit 34 then outputs a data completion signal DATC by counting the latter four bits of the bit sync signal BCLK. The data completion signal DATC indicates that the reception of all eight bits of the serial data DATA has completed.

The serial-parallel conversion circuit 33 converts the serial data DATA to parallel data, using a shift register which is composed of the upper four flip-flops shown in FIG. 25. Then, on the leading edge of the address completion signal ADT, the serial-parallel conversion circuit 33 latches an address SAD0–SAD2 and the increase/decrease direction bit SDD, which are included in the first four bits, into the lower four flip-flops in the figure. Hereby, the address SAD0–SAD2 and the increase/decrease direction bit SDD are separated from the data SD0–SD3, which is included in the latter four bits.

The write signal generation circuit 36 outputs a write signal REC during the period when both data completion signal DATC and unit signal ENAB are being outputted.

Figure 26:
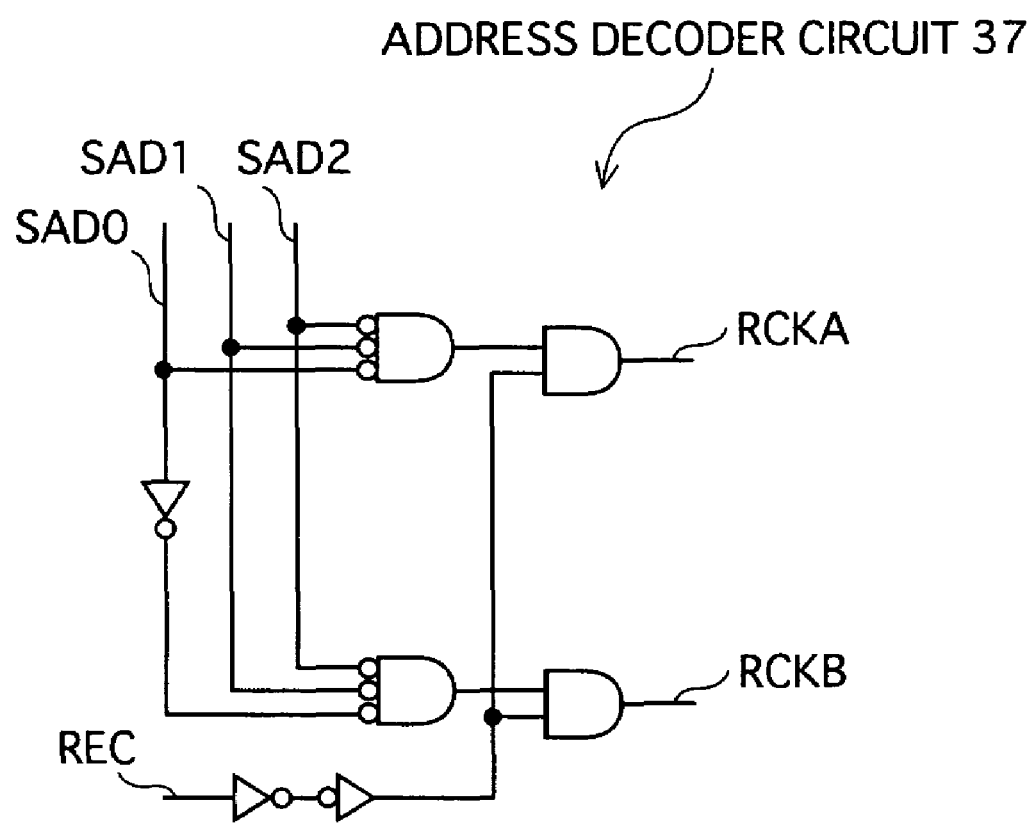
FIG. 26 is a functional block diagram showing a detailed configuration of an address decoder circuit.

FIG. 26 is a functional block diagram showing a detailed configuration of the address decoder circuit 37.

The address decoder circuit 37 generates signals RCKA and RCKB, which instruct the register circuit 38 to store the data SD0–SD3 and the increase/decrease direction bit SDD, according to the write signal REC and the address SAD0–SAD2. The signal RCKA is also used as a clock signal CLKPA while the signal RCKB is used as a clock signal CLKPB. These clock signals CLKPA and CLKPB respectively provide one pulse per step of the staircase signal for individual coils.

Figure 27:
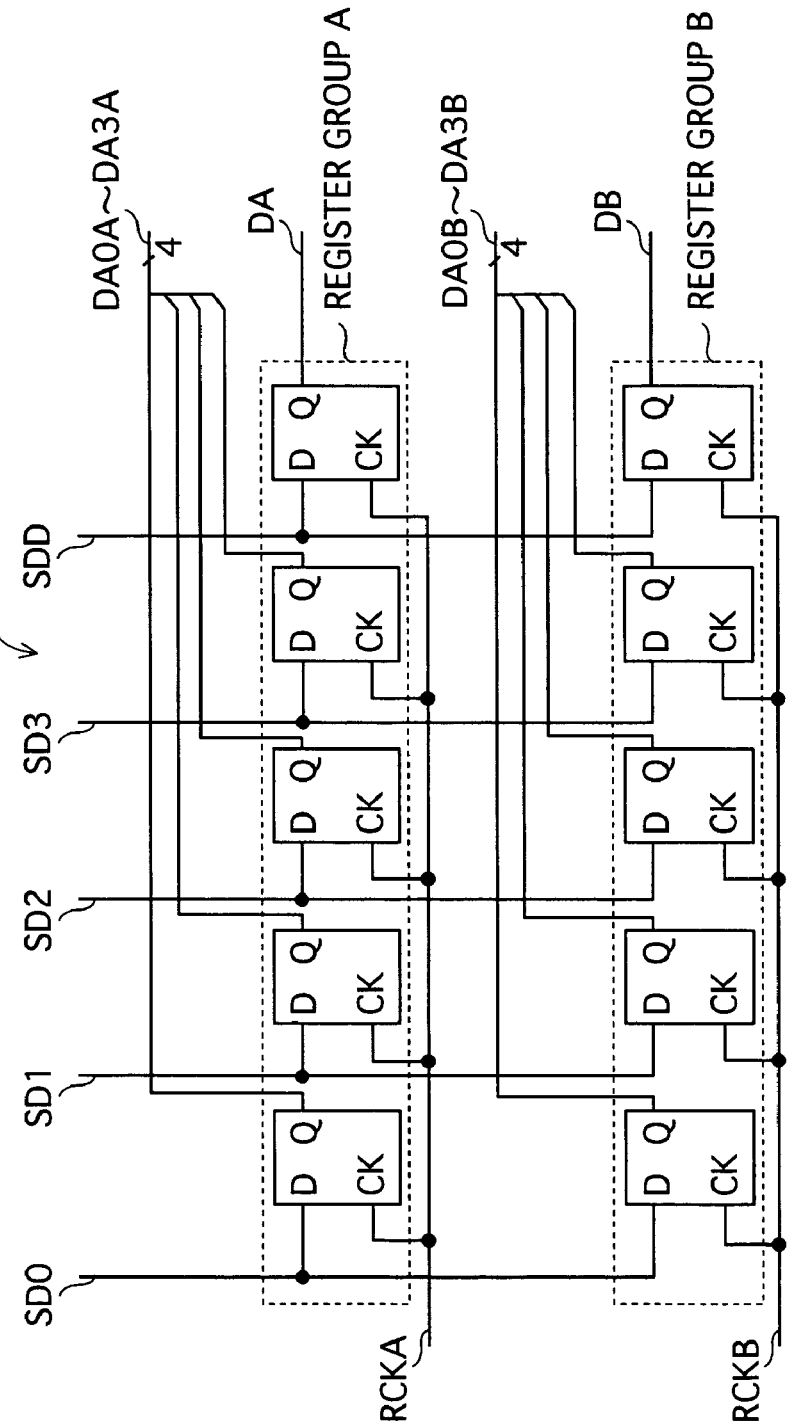
FIG. 27 is a functional block diagram showing a detailed configuration of a register circuit.
Figure 28:
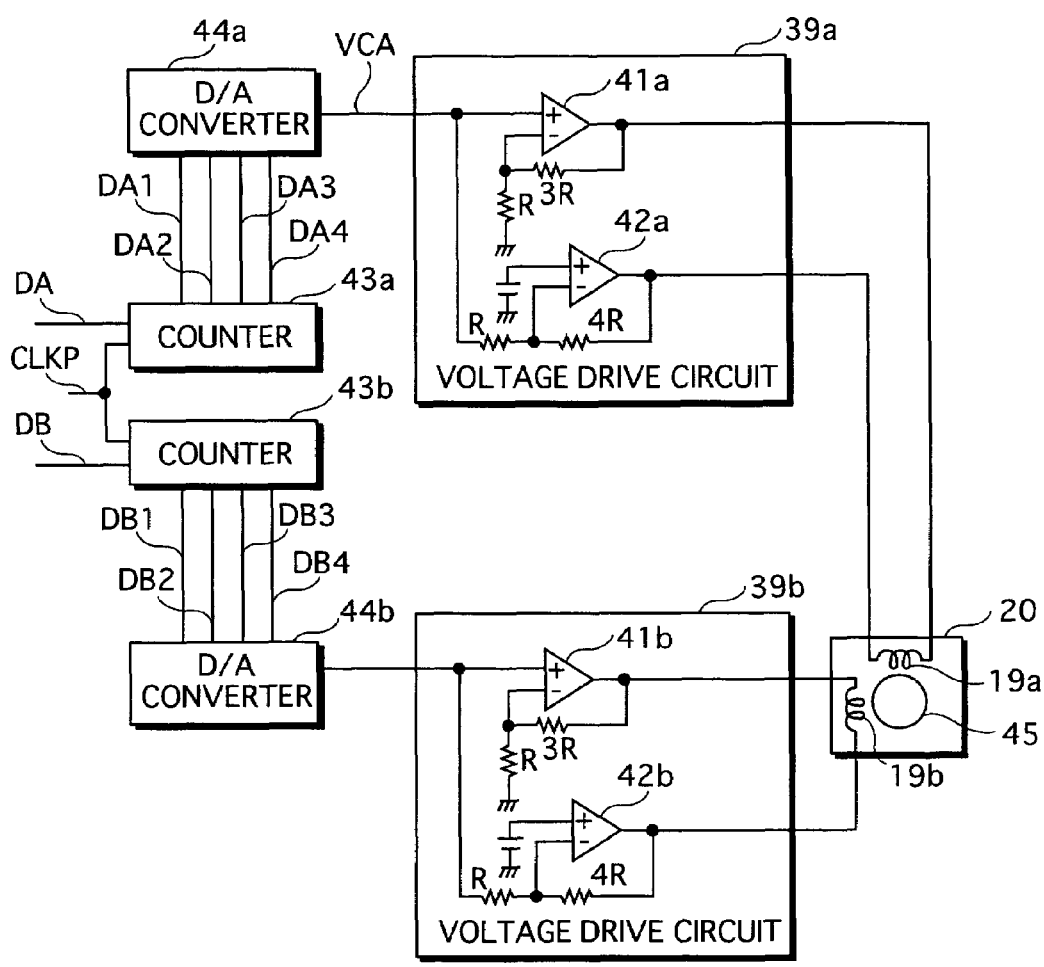
FIG. 28 is a functional block diagram showing a configuration of a conventional stepping motor drive device.

FIG. 27 is a functional block diagram showing a detailed configuration of the resister circuit 38.

The register circuit 38 has five-bit register groups A and B respectively corresponding to the first coil 19a and the second coil 19b. Upon receiving the signal RCKA, the register circuit 38 stores the data SD0–SD3 and the increase/decrease direction bit SDD into the register group A, and outputs these as five-bit parallel signal DA0A–DA3A and DA. Upon receiving the signal RCKB, the resister circuit 38 stores data SD0–SD3 and the increase/decrease direction bit SDD into the register group B, and outputs these as five-bit parallel signal DA0B–DA3B and DB.

Then, the reference signal generation unit 160a generates the staircase signal VCA by performing a digital-to-analog conversion on the parallel data DA0A–DA3A with respect to each pulse per step of the staircase signal, which is indicated by the clock signal CLKPA.

Individual step levels of the staircase signal VCA in this case are indicated by the serial data with respect to each step. Therefore, it is possible to obtain not only an approximate sinusoidal staircase signal as exemplified in the first embodiment, but also a staircase signal VCA approximating any waveform.

6. Other Modifications

The present invention has been described according to the above embodiments. However it is apparent that the present invention is not confined to these embodiments, and the following cases are also included in the present invention.

<1> The present invention includes stepping motor drive methods in which the stepping motor drive devices described in the above embodiments are used. These methods may be achieved by a computer program which is executed by a computer system, or may be achieved by a digital signal representing the computer program.

The present invention may also be achieved by a computer-readable storage medium, such as a flexible disk, a hard disk, a CD (Compact Disc), an MO (Magneto-Optical) disc, a DVD (Digital Versatile Disc), or a semiconductor memory, on which the above-mentioned computer program or digital signal is recorded.

The present invention may also be the computer program or digital signal to be transmitted via networks, as represented by telecommunications, wire/wireless communications, and the Internet.

The computer program or digital signal may be stored into the above storage medium and transferred to an independent computer system, or alternatively, may be transferred to an independent computer system via the above network. Then, the independent computer system may execute the computer program or digital signal.

<2> In the above respective embodiments, the transistors 13 and 11 are used to perform the chopping control over the supply current. However, by using the transistors 10 and 12 instead, the same effect can be achieved on vibration and noise reduction.

<3> Although the above respective embodiments exemplify a two-phase stepping motor, the present invention is not limited to this. The present invention also includes a stepping motor with a different number of phases. A five-phase stepping motor, in which supply currents to five coils are respectively controlled using reference signals each having an individual phase for a corresponding coil, is one example of this.

What is claimed is:

1. A stepping motor drive device comprising:
 a supply current measurement unit operable to measure a supply current to a coil of a stepping motor;
 a chopper unit operable to pass the supply current in a conducting state and stop the supply current in a non-conducting state;
 a PWM control unit operable to (i) bring the chopper unit into the conducting state in a predetermined cycle, and (ii) when in each cycle the measured supply current exceeds a limit indicator, to which the supply current is to be controlled and which is represented by a predetermined reference signal whose signal level changes over time, bring the chopper unit into the non-conducting state;
 a synchronous rectification unit operable to form, in a conducting state, a closed circuit together with the coil;

a synchronous rectification control unit operable to bring, during a time period when the chopper unit is in the non-conducting state, the synchronous rectification unit into the conducting state so as to make a regenerative current from the coil circulate around the closed circuit; and a synchronous rectification prohibition unit operable to prohibit, for at least a portion of a time period during which the limit indicator is decreasing, the synchronous rectification control unit from bringing the synchronous rectification unit into the conducting state.

2. The stepping motor drive device of claim 1, further comprising:

a flywheel diode which is connected in parallel with the synchronous rectification unit, wherein the synchronous rectification control unit makes the regenerative current circulate in the closed circuit through the flywheel diode during a time period when the synchronous rectification unit is in the non-conducting state.

3. The stepping motor drive device of claim 1, wherein the synchronous rectification prohibition unit (i) acquires a specification signal which specifies one of a plurality of different portions of a time period during which the limit indicator is decreasing, and (ii) during the specified portion, prohibits the synchronous rectification control unit from bringing the synchronous rectification unit into the conducting state.

4. The stepping motor drive device of claim 1, wherein the supply current measurement unit is a resistor connected in series with the coil and measures the supply current using a voltage appearing across the resistor.

5. The stepping motor drive device of claim 4, wherein the supply current measurement unit outputs a measurement result which is obtained by adding a positive offset to the measured supply current, and the PWM control unit (i) brings the chopper unit into the conducting state in the predetermined cycle, and (ii) when in each cycle the measurement result exceeds the limit indicator, brings the chopper unit into the non-conducting state.

6. The stepping motor drive device of claim 1, further comprising:

a bridge rectification circuit which includes the chopper unit, the synchronous rectification unit, and a plurality of switching units, and is operable to rectify the supply current; and a reference direction control unit operable to reverse a reference direction in which the supply current is to be managed, by bringing each of the switching units in the bridge rectification circuit into a predetermined state, the predetermined state being one of the conducting state and the non-conducting state.

7. The stepping motor drive device of claim 6, wherein the reference direction is indicated by a polarity signal, the stepping motor drive device further comprises:

a timing adjustment unit operable to delay the polarity signal for a time period required for the limit indicator to decrease by a predetermined amount, and the reference direction control unit reverses the reference direction according to the delayed polarity signal.

8. The stepping motor drive device of claim 7, wherein the PWM control unit maintains the chopper unit in the non-conducting state while the reference signal represents the limit indicator as zero.

9. The stepping motor drive device of claim 1, wherein the reference signal is represented in a staircase waveform, the stepping motor drive device further comprises:

a receiving unit operable to receive a data signal which indicates a level of each step of the reference signal, and a reference signal generation unit operable to generate the reference signal by digital-to-analog converting the received data signal within a time period corresponding to each step.

10. The stepping motor drive device of claim 1, wherein the stepping motor has a plurality of coils corresponding one-to-one with a plurality of phases, and for each of the plurality of coils the limit indicator is represented by an individual reference signal, the supply current measurement unit measures the supply current for each of the plurality of coils, the chopper unit is provided for each of the plurality of coils, and passes the supply current to the coil in the conducting state and stops the supply current to the coil, the PWM control unit, for each of the plurality of coils, (i) brings the corresponding chopper unit into the conducting state in the predetermined cycle, and (ii) when in each cycle the measured supply current exceeds the limit indicator, brings the corresponding chopper unit into the non-conducting state, the synchronous rectification unit is provided for each of the plurality of coils and forms an individual closed circuit together with the coil in the conducting state, the synchronous rectification control unit controls, for each of the plurality of coils, the corresponding synchronous rectification unit so as to make the regenerative current from the coil circulate around the corresponding closed circuit, and the synchronous rectification prohibition unit prohibits, for each of the plurality of coils, the synchronous rectification control unit from bringing the corresponding synchronous rectification unit into the conducting state.

11. A stepping motor drive method for a drive device having a synchronous rectification unit, the synchronous rectification unit which forms, in a conducting state, a closed circuit together with a coil included in a stepping motor, the stepping motor drive method comprising the steps of:

(a) measuring a supply current to the coil;

(b) making the supply current flow to the coil in a predetermined cycle and stopping the supply current when in each cycle the measured supply current exceeds a limit indicator, to which the supply current is to be controlled and which is represented by a predetermined reference signal whose signal level changes over time;

(c) bringing the synchronous rectification unit into a conducting state while the supply current is stopped so as to make a regenerative current from the coil circulate around the closed circuit; and (d) prohibiting the synchronous rectification unit, for at least a portion of a time period during which the limit indicator is decreasing, from being brought into the conducting state in the step (c).

12. The stepping motor drive method of claim 11, wherein the step (a) comprises:

an offset adding sub-step of adding a positive offset to the measured supply current, the step (a) takes the offset-added supply current as a measurement result, the step (b) makes the supply current flow to the coil in the predetermined cycle and stops the supply current when in each cycle the measurement result exceeds the limit indicator.

13. The stepping motor drive method of claim 11, further comprising the steps of:

(e) acquiring a polarity signal which indicates a reference direction in which the supply current is to be managed;

(f) delaying the polarity signal for a time period required for the limit indicator to decrease by a predetermined amount; and (g) reversing the reference direction according to the delayed polarity signal.

* * * * *